United States Patent
Funaki et al.

(10) Patent No.: US 11,930,431 B2
(45) Date of Patent: Mar. 12, 2024

(54) WIRELESS SENSOR SYSTEM, WIRELESS TERMINAL DEVICE, COMMUNICATION CONTROL METHOD AND COMMUNICATION CONTROL PROGRAM

(71) Applicant: Sumitomo Electric Industries, Ltd., Osaka (JP)

(72) Inventors: Masataka Funaki, Osaka (JP); Yoshizo Tanaka, Osaka (JP); Daigo Murata, Osaka (JP); Takashi Yamamoto, Osaka (JP)

(73) Assignee: SUMITOMO ELECTRIC INDUSTRIES, LTD., Osaka (JP)

(*) Notice: Subject to any disclaimer, the term of this patent is extended or adjusted under 35 U.S.C. 154(b) by 0 days.

(21) Appl. No.: 18/142,585

(22) Filed: May 3, 2023

(65) Prior Publication Data
US 2023/0319526 A1  Oct. 5, 2023

Related U.S. Application Data

(63) Continuation of application No. 17/838,264, filed on Jun. 13, 2022, now Pat. No. 11,683,669, which is a (Continued)

(30) Foreign Application Priority Data

Jun. 14, 2018 (JP) .................................. 2018-113921
Jun. 14, 2018 (JP) .................................. 2018-113923
Jun. 14, 2018 (JP) .................................. 2018-113950

(51) Int. Cl.
*H04W 4/38* (2018.01)
*H04W 72/0446* (2023.01)
*H04W 72/23* (2023.01)

(52) U.S. Cl.
CPC ......... *H04W 4/38* (2018.02); *H04W 72/0446* (2013.01); *H04W 72/23* (2023.01)

(58) Field of Classification Search
CPC .... H04W 4/38; H04W 72/23; H04W 72/0446
See application file for complete search history.

(56) References Cited

U.S. PATENT DOCUMENTS 5,408,690 A * 4/1995 Ishikawa ................ G01R 27/06
                                                    330/207 P
5,963,564 A * 10/1999 Petersen ............... H04L 49/606
                                                    370/465
(Continued)

FOREIGN PATENT DOCUMENTS

EP     3358427 A1 *  8/2018 ......... G05B 19/0423
JP     2000-115190 A   4/2000
(Continued)

OTHER PUBLICATIONS

International Search Report and Written Opinion dated Sep. 10, 2019, received for PCT Application No. PCT/JP2019/023479, Filed on Jun. 13, 2019, 18 pages including English Translation.
(Continued)

*Primary Examiner* — Hai V Nguyen
(74) *Attorney, Agent, or Firm* — XSENSUS LLP

(57) ABSTRACT

A wireless sensor system is provided with: a wireless terminal device which is driven by electric power stored in a power storage unit and transmits measurement information indicating a result of measurement by a sensor; and a management device which receives the measurement information transmitted from the wireless terminal device.

5 Claims, 19 Drawing Sheets

Related U.S. Application Data continuation of application No. 16/973,439, filed as application No. PCT/JP2019/023479 on Jun. 13, 2019, now Pat. No. 11,395,112.

(56) References Cited

U.S. PATENT DOCUMENTS

| | | | |
|---|---|---|---|
| 6,178,310 B1* | 1/2001 | Jeong | H04B 17/0085 455/67.11 |
| 6,480,783 B1* | 11/2002 | Myr | G08G 1/096838 340/990 |
| 6,684,062 B1* | 1/2004 | Gosior | A63F 13/20 455/66.1 |
| 6,944,542 B1* | 9/2005 | Eschenbach | G01S 5/0027 701/472 |
| 7,085,592 B1* | 8/2006 | Davies | H04B 17/20 455/67.14 |
| 7,307,820 B2* | 12/2007 | Henson | H02H 1/0015 324/536 |
| 7,385,701 B2* | 6/2008 | Watanabe | G01J 3/50 356/402 |
| 7,613,161 B2* | 11/2009 | Gummalla | H04L 47/2433 370/468 |
| 7,616,620 B2* | 11/2009 | Gummalla | H04N 21/2385 370/468 |
| 7,826,412 B2* | 11/2010 | Binding | H04W 52/0219 370/468 |
| 7,953,063 B2* | 5/2011 | Gummalla | H04L 65/80 370/468 |
| 7,965,180 B2* | 6/2011 | Koyama | H05K 7/00 340/572.1 |
| 8,242,903 B2* | 8/2012 | Koyama | H05K 7/00 340/572.1 |
| 8,359,171 B2* | 1/2013 | Bleys | G01L 19/086 702/140 |
| 8,427,287 B2* | 4/2013 | Heininger | B60Q 1/1423 340/505 |
| 8,508,360 B2* | 8/2013 | Koyama | A61B 5/076 340/572.1 |
| 8,687,729 B2* | 4/2014 | Honda | H04B 7/0811 375/267 |
| 9,143,425 B2* | 9/2015 | Guo | H04L 12/4633 |
| 9,485,883 B2* | 11/2016 | Koyama | H01L 23/66 |
| 9,565,513 B1* | 2/2017 | Malek | H04W 4/80 |
| 9,784,674 B2* | 10/2017 | Miron | G01N 21/031 |
| 9,801,137 B2* | 10/2017 | Ree | H04W 52/0296 |
| 9,819,261 B2* | 11/2017 | Yamazaki | H04B 1/1615 |
| 9,952,074 B2* | 4/2018 | Freund | F24F 11/74 |
| 10,057,396 B2* | 8/2018 | Kärkkäinen | H04M 1/575 |
| 10,148,301 B2* | 12/2018 | Koyama | G16H 40/67 |
| 10,305,543 B2* | 5/2019 | Guillot | H04B 3/548 |
| 10,314,649 B2* | 6/2019 | Bakos | A61B 18/1492 |
| 10,326,518 B1* | 6/2019 | Magley | H04L 47/283 |
| 10,397,872 B2* | 8/2019 | Choi | H04W 72/0446 |
| 10,542,497 B2* | 1/2020 | Ree | H04W 52/0219 |
| 10,587,297 B2* | 3/2020 | Koyama | H05K 1/118 |
| 10,630,176 B2* | 4/2020 | Yamazaki | G06F 1/32 |
| 10,750,429 B2* | 8/2020 | Serizawa | H04W 40/22 |
| 10,764,825 B2* | 9/2020 | Tsuda | H04W 52/0216 |
| 10,855,526 B2* | 12/2020 | Yoshida | H04B 7/14 |
| 11,006,832 B2* | 5/2021 | Koyama | H05K 7/00 |
| 11,031,785 B1* | 6/2021 | Erokhovets | H02J 3/381 |
| 11,173,925 B2* | 11/2021 | Suzuki | B60W 40/09 |
| 11,223,931 B2* | 1/2022 | Yamamoto | H04W 4/00 |
| 11,395,112 B2* | 7/2022 | Funaki | G08C 17/00 |
| 11,540,354 B2* | 12/2022 | Saldin | H04L 45/28 |
| 11,683,669 B2* | 6/2023 | Funaki | H04W 72/0446 455/509 |
| 11,758,487 B2* | 9/2023 | Cheng | H04W 52/346 455/522 |
| 2002/0169005 A1 | 11/2002 | Hiramatsu et al. | |
| 2005/0204061 A1* | 9/2005 | Farchmin | H04L 47/70 709/245 |
| 2006/0039316 A1* | 2/2006 | Ogushi | H04W 8/26 370/328 |
| 2006/0109458 A1* | 5/2006 | Watanabe | G01J 3/50 356/243.4 |
| 2006/0190458 A1 | 8/2006 | Mishina et al. | |
| 2007/0197234 A1* | 8/2007 | Gill | H04W 68/12 455/458 |
| 2007/0262863 A1* | 11/2007 | Aritsuka | H04B 17/27 370/254 |
| 2007/0282944 A1* | 12/2007 | Odaka | H04L 67/56 709/203 |
| 2007/0299956 A1* | 12/2007 | Odaka | H04L 67/56 709/223 |
| 2008/0049700 A1* | 2/2008 | Shah | H04W 52/0225 455/425 |
| 2008/0081573 A1* | 4/2008 | Hwang | H03G 3/3068 455/194.2 |
| 2009/0058634 A1* | 3/2009 | Maltseff | H04L 67/12 340/539.11 |
| 2009/0059843 A1* | 3/2009 | Binding | H04W 8/245 370/328 |
| 2009/0063760 A1* | 3/2009 | Weddle | G06F 13/1689 711/E12.001 |
| 2009/0168678 A1* | 7/2009 | Han | H04W 52/0225 370/311 |
| 2009/0213821 A1* | 8/2009 | Fonseca, Jr. | H04W 52/0225 370/338 |
| 2010/0023988 A1* | 1/2010 | Gummalla | H04L 12/2861 725/111 |
| 2010/0131213 A1* | 5/2010 | Bleys | G01L 19/086 702/50 |
| 2011/0228065 A1* | 9/2011 | Koyama | H01G 11/22 348/E5.026 |
| 2011/0316680 A1* | 12/2011 | Heininger | B60R 25/24 340/425.5 |
| 2012/0071123 A1* | 3/2012 | Jones | H04B 7/0814 455/150.1 |
| 2012/0093127 A1* | 4/2012 | Suzuki | H04L 1/1858 370/329 |
| 2012/0155287 A1* | 6/2012 | Huang | H04B 1/0466 370/242 |
| 2012/0243584 A1* | 9/2012 | Honda | H04B 7/0811 375/219 |
| 2012/0287584 A1* | 11/2012 | Koyama | H01L 23/60 361/728 |
| 2012/0323391 A1* | 12/2012 | Drake | H04L 12/12 700/296 |
| 2013/0043975 A1* | 2/2013 | Hyde | A61B 5/4833 340/5.64 |
| 2013/0043991 A1* | 2/2013 | Hyde | A61B 5/4833 340/539.1 |
| 2013/0043993 A1* | 2/2013 | Hyde | A61B 5/4833 340/539.12 |
| 2013/0046153 A1* | 2/2013 | Hyde | A61B 5/4833 340/539.12 |
| 2013/0046477 A1* | 2/2013 | Hyde | A61B 5/4833 702/19 |
| 2013/0064173 A1* | 3/2013 | Sivakeesar | H04B 7/2606 370/315 |
| 2013/0089039 A1 | 4/2013 | Vashi et al. | |
| 2013/0321995 A1* | 12/2013 | Koyama | H01L 23/66 361/679.01 |
| 2014/0106777 A1* | 4/2014 | Fukuda | G01S 5/0027 455/456.1 |
| 2014/0106778 A1* | 4/2014 | Fukuda | H04W 4/023 455/456.1 |
| 2014/0143429 A1* | 5/2014 | Farchmin | G05B 19/0426 709/226 |
| 2015/0047947 A1* | 2/2015 | Tait | B60L 53/80 198/339.1 |
| 2015/0051719 A1* | 2/2015 | Mutschler | H04L 67/52 700/91 |
| 2015/0098375 A1* | 4/2015 | Ree | H04W 52/0219 370/311 |
| 2015/0304909 A1* | 10/2015 | Yoshimoto | H04W 36/0066 370/331 |

(56) References Cited

U.S. PATENT DOCUMENTS

| | | | | |
|---|---|---|---|---|
| 2016/0084757 A1* | 3/2016 | Miron | ............... | G01N 21/031 |
| | | | | 356/437 |
| 2016/0112994 A1* | 4/2016 | Wang | ............... | H04W 16/32 |
| | | | | 370/329 |
| 2016/0224803 A1* | 8/2016 | Frank | ............... | G06F 21/6245 |
| 2016/0262355 A1* | 9/2016 | Swan | ............... | A01K 29/005 |
| 2016/0364104 A1* | 12/2016 | Ishii | ............... | G06F 3/0484 |
| 2017/0059373 A1* | 3/2017 | Freund | ............... | F24F 11/74 |
| 2017/0088072 A1* | 3/2017 | Curtis | ............... | G08B 31/00 |
| 2017/0201850 A1* | 7/2017 | Raleigh | ............... | H04W 4/50 |
| 2017/0228502 A1* | 8/2017 | Rickard | ............... | G16H 10/60 |
| 2017/0244436 A1* | 8/2017 | Koyama | ............... | H01G 11/22 |
| 2017/0311574 A1* | 11/2017 | Swan | ............... | G06V 40/10 |
| 2018/0007636 A1* | 1/2018 | Ree | ............... | H04W 52/0229 |
| 2018/0011973 A1* | 1/2018 | Fish | ............... | A61B 5/1176 |
| 2018/0020270 A1* | 1/2018 | Colonna | ............... | H04L 63/102 |
| 2018/0123455 A1* | 5/2018 | Yamazaki | ............... | G06F 1/32 |
| 2018/0227171 A1* | 8/2018 | Yoshida | ............... | H04L 41/0803 |
| 2018/0234919 A1* | 8/2018 | Tsuda | ............... | H04W 88/04 |
| 2018/0279222 A1* | 9/2018 | VanderZee | ............... | F24F 11/30 |
| 2018/0293949 A1* | 10/2018 | Nakamura | ............... | G09G 5/399 |
| 2018/0308569 A1* | 10/2018 | Luellen | ............... | G16H 20/10 |
| 2019/0069238 A1* | 2/2019 | Choi | ............... | H04W 72/0446 |
| 2019/0087554 A1* | 3/2019 | Fish | ............... | H04M 1/724631 |
| 2019/0132026 A1* | 5/2019 | Guillot | ............... | H04B 3/548 |
| 2019/0132815 A1* | 5/2019 | Zampini, II | ............... | G06Q 50/06 |
| 2019/0154439 A1* | 5/2019 | Binder | ............... | G01B 11/26 |
| 2019/0170169 A1* | 6/2019 | Weinhardt | ............... | F15B 1/033 |
| 2019/0173505 A1* | 6/2019 | Koyama | ............... | H01L 23/66 |
| 2019/0273764 A1* | 9/2019 | Tanimoto | ............... | H04L 67/303 |
| 2020/0195286 A1* | 6/2020 | Koyama | ............... | H01L 27/13 |
| 2020/0294401 A1* | 9/2020 | Kerecsen | ............... | G05D 1/0287 |
| 2020/0336066 A1* | 10/2020 | Yamazaki | ............... | G01D 4/004 |
| 2020/0374606 A1* | 11/2020 | Boisset | ............... | G07C 5/0841 |
| 2021/0023667 A1* | 1/2021 | Liu | ............... | B23Q 11/0007 |
| 2021/0100069 A1* | 4/2021 | Saldin | ............... | H04L 45/72 |
| 2021/0169328 A1* | 6/2021 | Koyama | ............... | G16H 40/63 |
| 2021/0173096 A1* | 6/2021 | Petrak | ............... | G06T 11/006 |
| 2021/0203165 A1* | 7/2021 | Erokhovets | ............... | H02J 9/061 |
| 2021/0241257 A1* | 8/2021 | Judkins | ............... | G06Q 30/0212 |
| 2021/0249912 A1* | 8/2021 | Glover | ............... | H02J 50/40 |
| 2021/0258749 A1* | 8/2021 | Funaki | ............... | H04W 72/0446 |
| 2021/0263129 A1* | 8/2021 | Pulle | ............... | G01S 13/003 |
| 2021/0288981 A1* | 9/2021 | Numainville | ............... | H04L 63/1441 |
| 2021/0364651 A1* | 11/2021 | Helms | ............... | G06Q 10/083 |
| 2021/0381591 A1* | 12/2021 | Weinhardt | ............... | F16H 61/12 |
| 2022/0150308 A1* | 5/2022 | Hua | ............... | H04W 4/38 |
| 2022/0279699 A1* | 9/2022 | Mazzarolo | ............... | A01G 17/02 |
| 2022/0312161 A1* | 9/2022 | Funaki | ............... | H04W 72/23 |
| 2023/0084594 A1* | 3/2023 | Saldin | ............... | H04W 88/16 |
| | | | | 370/401 |

FOREIGN PATENT DOCUMENTS

| | | |
|---|---|---|
| JP | 2004-126852 A | 4/2004 |
| JP | 2006-237668 A | 9/2006 |
| JP | 2006-238300 A | 9/2006 |
| JP | 2009-261013 A | 11/2009 |
| JP | 2011-109338 A | 6/2011 |
| JP | 2014-534682 A | 12/2014 |
| JP | 2017-211737 A | 11/2017 |
| JP | 2018-078412 A | 5/2018 |

OTHER PUBLICATIONS

"Wireless Sensor Network", Wikipedia, Online Available At: https://en.wikipedia.org/wiki/Wireless_sensor_network, 14 pages including English Translation.

* cited by examiner

FIG. 5

PROBE REQUEST

| PHY HEADER | MAC HEADER | MESSAGE TYPE |

FIG. 6

| PHY HEADER | MAC HEADER | MESSAGE TYPE | TRUE SENSOR ID | FIRMWARE VERSION | SETTING INFORMATION |

PREPARATION REQUEST

FIG. 10

| TRUE SENSOR ID | PROVISIONAL SENSOR ID | CONFIGU-RATION NUMBER | CONNECTION DESTINATION RELAY DEVICE ID | FIRMWARE VERSION | SETTING INFORMATION ||||||| SENSOR PARAMETER ||
|---|---|---|---|---|---|---|---|---|---|---|---|---|
| | | | | | SENSOR TYPE | RESETTING CYCLE | TRANS-MISSION CYCLE | ONE-WAY COMMUNICATION CH | ONE-WAY COMMUNICATION DATA RATE | ... | CLAMPING NUMBER | CLAMPING TYPE |
| 0x0000 00000000 0001 | 0x0001 | 0x00 | 0x0011 | 0 | t1 | T1 | t1 | Ch1 | 100kbps | ... | 1 | 10φ |
| 0x0000 00000000 0002 | 0x0002 | 0x01 | 0x0011 | 0 | t2 | T2 | t2 | Ch2 | 100kbps | ... | 1 | 10φ |
| ..... | ..... | ..... | ..... | ..... | ..... | ..... | ..... | ..... | ..... | ..... | ..... | ..... |

FIG. 12

SETTING RESPONSE: | PHY HEADER | MAC HEADER | MESSAGE TYPE | TRUE SENSOR ID | PROVISIONAL SENSOR ID | CONFIGURATION NUMBER | SETTING INFORMATION |

FIG. 13

| PHY HEADER | MAC HEADER | CONFIGURATION NUMBER | SENSOR MEASUREMENT VALUE |

MEASUREMENT INFORMATION

FIG. 14

| PHY HEADER | MAC HEADER | MESSAGE TYPE | CONFIGURATION NUMBER |

RE-PREPARATION REQUEST

FIG. 15

| PHY HEADER | MAC HEADER | MESSAGE TYPE | RECONFIGURATION TYPE "1" OR "3" | SETTING INFORMATION |

RESETTING RESPONSE

FIG. 16

RESETTING RESPONSE

| PHY HEADER | MAC HEADER | MESSAGE TYPE | CONFIGURATION NUMBER | RECONFIGURATION TYPE "2" | SETTING INFORMATION |

WIRELESS SENSOR SYSTEM, WIRELESS TERMINAL DEVICE, COMMUNICATION CONTROL METHOD AND COMMUNICATION CONTROL PROGRAM

CROSS-REFERENCE TO RELATED APPLICATIONS

The present application is a continuation of U.S. application Ser. No. 17/838,264, filed Jun. 13, 2022, which is a continuation of U.S. application Ser. No. 16/973,439, filed Dec. 9, 2020 (now U.S. Pat. No. 11,395,112), which is based on PCT filing PCT/JP2019/023479, filed Jun. 13, 2019, which claims priority to Japanese Patent Applications No. 2018-113921, No. 2018-113950 and No. 2018-113923 filed on Jun. 14, 2018, the entire contents of each are incorporated herein by reference.

TECHNICAL FIELD

The present invention relates to a wireless sensor system, a wireless terminal device, a communication control method, and a communication control program.

BACKGROUND ART

A sensor network (Wireless Sensor Networks, WSN) is described in "Wikipedia", [online], [searched on May 11, 2018] on the Internet <URL:http://ja.wikipedia.org/wiki/センサネットワーク> (NON-PATENT LITERATURE 1). That is, a sensor network is a wireless network that causes a plurality of wireless devices with sensors to spatially disperse, and enables the wireless devices to collect the environment and physical conditions in cooperation with each other. The sensor network is one of the core technologies used in IoT (Internet of Things).

CITATION LIST

Patent Literature

PATENT LITERATURE 1: Japanese Laid-Open Patent Publication No. 2009-261013
PATENT LITERATURE 2: Japanese Laid-Open Patent Publication No. 2011-109338

Non-Patent Literature

NON-PATENT LITERATURE 1: "Wikipedia". [online], [searched on May 11, 2018] on the Internet <URL:http://ja.wikipedia.org/wiki/センサネットワーク>

SUMMARY OF INVENTION (1) A wireless sensor system according to the present disclosure includes: a wireless terminal device which is driven by electric power stored in a power storage unit, and is configured to transmit measurement information indicating a result of measurement by a sensor; and a management device configured to receive the measurement information transmitted from the wireless terminal device. The wireless terminal device performs one-way communication in a first period, transmits the measurement information in the first period, performs bidirectional communication in a second period different from the first period, and transmits other information in the second period.

(15) A wireless terminal device according to the present disclosure is driven by electric power stored in a power storage unit, and includes: a data creation unit configured to create measurement information indicating a result of measurement by a sensor; and a communication unit configured to transmit a radio signal including the measurement information created by the data creation unit or other information. The communication unit performs one-way communication in a first period, transmits the measurement information in the first period, performs bidirectional communication in a second period different from the first period, and transmits the other information in the second period.

(16) A communication control method according to the present disclosure is performed in a wireless sensor system including: a wireless terminal device driven by electric power stored in a power storage unit; and a management device configured to receive information transmitted from the wireless terminal device. The method includes: by the wireless terminal device, performing one-way communication in a first period, and transmitting, in the first period, measurement information indicating a result of measurement of a sensor; and by the wireless terminal device, performing bidirectional communication in a second period different form the first period, and transmitting other information in the second period.

(17) A communication control program according to the present disclosure is used in a wireless terminal device driven by electric power stored in a power storage unit. The program causes a computer to function as: a data creation unit configured to create measurement information indicating a result of measurement by a sensor; and a communication unit configured to transmit a radio signal including the measurement information by one-way communication. The communication unit performs one-way communication in a first period, transmits the measurement information in the first period, performs bidirectional communication in a second period different from the first period, and transmits other information in the second period.

(18) A wireless sensor system according to the present disclosure includes: a wireless terminal device which is driven by electric power stored in a power storage unit, and is configured to transmit measurement information indicating a result of measurement by a sensor; a relay device configured to relay information received from the wireless terminal device: and a management device configured to receive the measurement information relayed by the relay device. The wireless terminal device transmits a preparation request, the relay device receives the preparation request transmitted from the wireless terminal device, and relays the preparation request to the management device, the management device receives the preparation request relayed by the relay device, and transmits, to the relay device, setting information related to the wireless terminal device, the relay device receives and holds the setting information transmitted from the management device, after transmission of the preparation request, the wireless terminal device transitions to a first sleep state to stop a communication operation, and transmits a setting request after returning from the first sleep state, and the relay device receives the setting request transmitted from the wireless terminal device, and transmits the setting information held therein to the wireless terminal device.

(25) A communication control method according to the present disclosure is performed in a wireless sensor system including: a wireless terminal device which is driven by electric power stored in a power storage unit and is configured to transmit measurement information indicating a result of measurement by a sensor: a relay device configured to relay the information received from the wireless terminal device: and a management device configured to receive the measurement information relayed by the relay device. The method includes: by the wireless terminal device, transmitting a preparation request; by the relay device, receiving the preparation request transmitted from the wireless terminal device, and relaying the preparation request to the management device; by the management device, receiving the preparation request relayed by the relay device, and transmitting setting information related to the wireless terminal device to the relay device; by the relay device, receiving and holding the setting information transmitted from the management device: by the wireless terminal device, transitioning to a first sleep state to stop a communication operation, after transmission of the preparation request; by the wireless terminal device, transmitting a setting request after returning from the first sleep state; and by the relay device, receiving the setting request transmitted from the wireless terminal device, and transmitting the setting information held therein to the wireless terminal device.

(26) A wireless sensor system according to the present disclosure includes: one or a plurality of wireless terminal devices each being driven by electric power stored in a power storage unit, and being configured to transmit measurement information indicating a result of measurement by a sensor; a plurality of lower-order management devices configured to receive the measurement information transmitted from the wireless terminal devices; and a higher-order management device configured to be communicable with each lower-order management device. The higher-order management device assigns, to each wireless terminal device, terminal identification information having a shorter data length than unique identification information, of the wireless terminal device, which is registered therein, and the wireless terminal device includes, in the measurement information, the terminal identification information assigned by the higher-order management device, and transmits the measurement information.

(28) A wireless sensor system according to the present disclosure includes: one or a plurality of wireless terminal devices each being driven by electric power stored in a power storage unit, and being configured to transmit measurement information indicating a result of measurement by a sensor; a plurality of lower-order management devices configured to receive the measurement information transmitted from the wireless terminal devices; and a higher-order management device configured to be communicable with each lower-order management device. The higher-order management device assigns, to each wireless terminal device, identification information that allows identification of a format of the measurement information, and the wireless terminal device includes, in the measurement information, the identification information assigned by the higher-order management device, and transmits the measurement information.

(29) A communication control method according to the present disclosure is performed in a wireless sensor system including: one or a plurality of wireless terminal devices each being driven by electric power stored in a power storage unit and being configured to transmit measurement information indicating a result of measurement by a sensor; a plurality of lower-order management devices configured to receive the measurement information transmitted from the wireless terminal devices; and a higher-order management device configured to be communicable with each lower-order management device. The method includes: by the higher-order management device, assigning, to each wireless terminal device, terminal identification information having a shorter data length than unique identification information, of the wireless terminal device, which is registered in the higher-order management device; and by each wireless terminal device, including the assigned terminal identification information in the measurement information, and transmitting the measurement information.

(30) A communication control method according to the present disclosure is performed in a wireless sensor system including: one or a plurality of wireless terminal devices each being driven by electric power stored in a power storage unit and being configured to transmit measurement information indicating a result of measurement by a sensor; a plurality of lower-order management devices configured to receive the measurement information transmitted from the wireless terminal devices; and a higher-order management device configured to be communicable with each lower-order management device. The method includes: by the higher-order management device, assigning, to each wireless terminal device, identification information that allows identification of a format of the measurement information: and by each wireless terminal device, including the identification information assigned by the higher-order management device in the measurement information, and transmitting the measurement information.

One aspect of the present disclosure can be realized not only as a wireless sensor system that includes such characteristic processing units but also as a program that causes a computer to execute such characteristic process steps. In addition, one aspect of the present disclosure can be realized as a semiconductor integrated circuit that realizes a part of or the entire wireless sensor system.

One aspect of the present disclosure can be realized not only as a wireless terminal device that includes such characteristic processing units but also as a communication control method that includes such characteristic processes as steps. In addition, one aspect of the present disclosure can be realized as a semiconductor integrated circuit that realizes a part of or the entire wireless terminal device.

BRIEF DESCRIPTION OF DRAWINGS

FIG. 5 shows an example of a data format of a probe request transmitted by the wireless terminal device in the wireless sensor system according to the embodiment of the present disclosure.

FIG. 6 shows an example of a data format of a preparation request transmitted by the wireless terminal device in the wireless sensor system according to the embodiment of the present disclosure.

FIG. 10 shows an example of a configuration table held by the higher-order management device in the wireless sensor system according to the embodiment of the present disclosure.

FIG. 12 shows an example of a data format of a setting response transmitted by the relay device in the wireless sensor system according to the embodiment of the present disclosure.

FIG. 13 shows an example of a data format of measurement information transmitted by the wireless terminal device in the wireless sensor system according to the embodiment of the present disclosure.

FIG. 14 shows an example of a data format of a re-preparation request transmitted by the wireless terminal device in the wireless sensor system according to the embodiment of the present disclosure.

FIG. 15 shows an example of a data format of a resetting response transmitted by the relay device in the wireless sensor system according to the embodiment of the present disclosure.

FIG. 16 shows another example of a data format of a resetting response transmitted by the relay device in the wireless sensor system according to the embodiment of the present disclosure.

DESCRIPTION OF EMBODIMENTS

Figure 1:
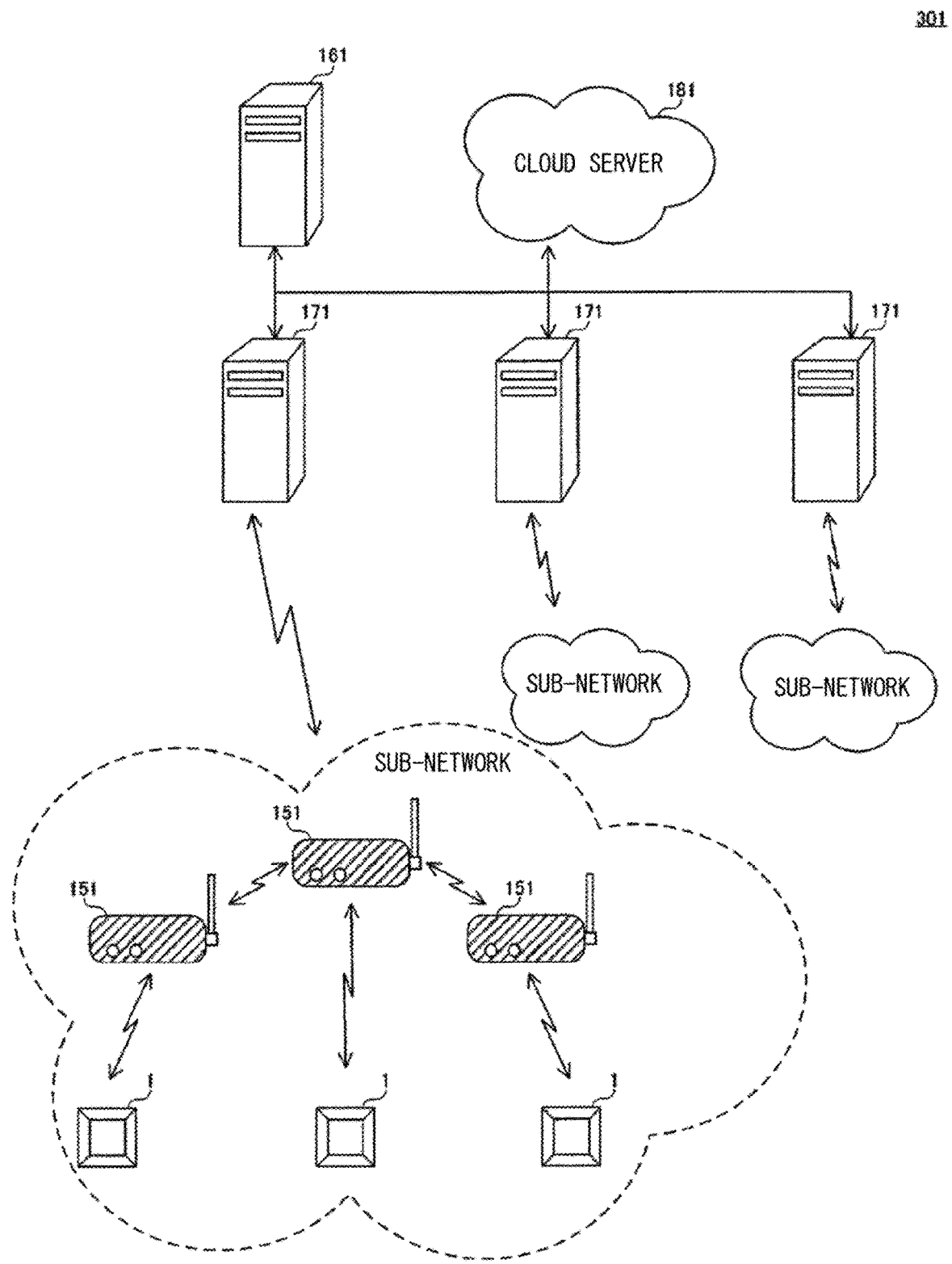
FIG. 1 shows a configuration of a wireless sensor system according to an embodiment of the present disclosure.

Problems to be Solved by the Present Disclosure

For example, a configuration in which the results of measurements by sensors are aggregated by a management device using the mechanism described in NON-PATENT LITERATURE 1, is conceivable. In this configuration, packets transmitted from wireless terminal devices are transmitted to the management device via one or a plurality of relay devices.

A technology capable of constructing an excellent system for transmitting a result of measurement by a sensor from the wireless terminal devices to the management device, is desired.

The present disclosure has been made to solve the above problems and an object of the present disclosure is to provide a wireless sensor system, a wireless terminal device, a communication control method, and a communication control program capable of constructing an excellent system for transmitting a result of measurement by a sensor from wireless terminal devices to a management device.

Effects of the Present Disclosure

According to the present disclosure, it is possible to construct an excellent system for transmitting a result of measurement by a sensor from wireless terminal devices to a management device.

Description of Embodiment of the Present Disclosure

First, contents of embodiments of the present disclosure are listed and described.

(1) A wireless sensor system according to an embodiment of the present disclosure includes: a wireless terminal device which is driven by electric power stored in a power storage unit, and is configured to transmit measurement information indicating a result of measurement by a sensor; and a management device configured to receive the measurement information transmitted from the wireless terminal device. The wireless terminal device performs one-way communication in a first period, transmits the measurement information in the first period, performs bidirectional communication in a second period different from the first period, and transmits other information in the second period.

With this configuration, switching between the one-way communication and the bidirectional communication can be achieved according to information to be transmitted. In addition, since information other than the result of measurement by the sensor is transmitted/received through the bidirectional communication, it is possible to transmit setting information of the sensor, firmware update information, etc., from the management device to the wireless terminal device. This makes it unnecessary to go to a site where the wireless terminal device is installed and change settings or the like. In addition, since a switch, etc., for setting of the wireless terminal device can be dispensed with, the cost of the wireless terminal device can be reduced. Therefore, an excellent system for transmitting the result of measurement by the sensor from the wireless terminal device to the management device can be constructed.

(2) Preferably, the second period includes a period that is periodically or non-periodically started after an initial period that exists from when the wireless terminal device starts up to when the first period is started.

With this configuration, since the period for performing the bidirectional communication is limited to the second period, the transmission amount of data can be reduced. When the wireless terminal device and the management device perform asynchronous communication, it is difficult for the wireless terminal device to recognize the timing to transmit data. Therefore, the wireless terminal device needs to wait for data during the period for performing the bidirectional communication, which results in an increase in power consumption. However, since the period for performing the bidirectional communication is limited to the second period, power consumption of the wireless terminal device can be reduced.

(3) More preferably, the wireless terminal device uses different channels for the one-way communication and the bidirectional communication.

With this configuration, in the one-way communication in which a data retransmission process is not performed, interference of radio signals between the wireless terminal devices can be inhibited, whereby the risk of missing data due to such interference can be reduced.

(4) Preferably, the management device outputs information that allows recognition of the second period.

With this configuration, an administrator or the like can recognize the time, the timing, etc., at which the wireless sensor system performs the bidirectional communication. Therefore, this configuration is useful for maintenance, etc.

(5) Preferably, the management device transmits, to the wireless terminal device, setting information related to the wireless terminal device, and the wireless terminal device receives, in the second period, the setting information transmitted from the management device, and transmits the measurement information according to the received setting information.

With this configuration, setting of the wireless terminal device can be performed through communication, and therefore, setting change or the like can be remotely performed in a short time during a desired period.

(6) More preferably, the management device further transmits, to the wireless terminal device, identification information that allows identification of a format of the measurement information, and the wireless terminal device receives, in the second period, the identification information transmitted from the management device, and transmits the received identification information.

As described above, since the wireless terminal device transmits information indicating the setting content thereof, the management device can easily determine whether or not the setting content of the wireless terminal device is appropriate.

(7) More preferably, the wireless terminal device includes the identification information in the measurement information, and transmits the measurement information.

With this configuration, even when the management device cannot confirm, during the second period, whether or not change in the setting content has been reflected in the wireless terminal device, the management device can confirm, during the first period, whether or not change in the setting content has been reflected. Therefore, the management device can recognize the setting content of the wireless terminal device more reliably.

(8) More preferably, the management device receives the measurement information transmitted from the wireless terminal device, and processes the received measurement information by using a format corresponding to the identification information included in the received measurement information.

With this configuration, the process for the measurement information can be simplified.

(9) More preferably, the management device holds, at least, most recent identification information transmitted to the wireless terminal device and most recent identification information received from the wireless terminal device.

With this configuration, even when the measurement information according to the setting content before reflection of change in the setting content is transmitted from the wireless terminal device, the management device can accurately process the measurement information.

In addition, an administrator or the like can confirm the setting content to be set by the wireless terminal device.

(10) More preferably, the wireless terminal device transmits the identification information in the second period that is periodically or non-periodically started, and the management device receives the identification information transmitted from the wireless terminal device, holds the setting information corresponding to the identification information, and selectively transmits a content, out of contents of the setting information to be newly applied to the wireless terminal device, which is different from the held setting information, to the wireless terminal device.

With this configuration, the setting content of the wireless terminal device can be confirmed at predetermined intervals, and a necessary setting content can be reflected in the wireless terminal device. In addition, since only an updated part is transmitted to the wireless terminal device, the transmission amount of data from the management device can be reduced.

(11) More preferably, the wireless terminal device transmits the setting information registered in advance, during the second period that exists from when the wireless terminal device starts up to when the first period is started.

With this configuration, the management device can grasp the initial setting of the wireless terminal device, and therefore can confirm, before transmission of the measurement information from the wireless terminal device, whether or not the setting content of the wireless terminal device is appropriate. In addition, the management device can grasp the setting of the wireless terminal device even if the wireless terminal device does not include the setting information in the measurement information each time the measurement information is transmitted. Therefore, the amount of data transmitted from the wireless terminal device can be reduced.

(12) More preferably, the management device receives the setting information transmitted from the wireless terminal device, and selectively transmits a content, out of the contents of the setting information to be newly applied to the wireless terminal device, which is different from the received setting information, to the wireless terminal device.

With this configuration, when the initial setting need not be changed, the transmission amount of data from the management device can be reduced.

(13) More preferably, the management device receives the setting information transmitted from the wireless terminal device, and transmits the identification information to the wireless terminal device, regardless of whether or not there is a content, out of the contents of the setting information to be newly applied to the wireless terminal device, which is different from the received setting information.

With this configuration, the wireless terminal device can more reliably recognize the content to be set therein. In addition, the management device can more reliably process the measurement information from the wireless terminal device.

(14) More preferably, the management device receives the setting information transmitted from the wireless terminal device, and transmits, to the wireless terminal device, terminal identification information having a shorter data length than unique identification information, of the wireless terminal device, registered in the management device, regardless of whether or not there is a content, out of the contents of the setting information to be newly applied to the wireless terminal device, which is different from the received setting information.

With this configuration, the transmission amount of data in the wireless sensor system can be reduced. In addition, since the management device unitarily manages the terminal identification information, overlapping of the terminal identification information can be avoided in contrast to the case where, for example, terminal identification information is determined and assigned to each of networks under control of the same management device. Therefore, even when the wireless terminal device moves to another network under control of the same management device, the wireless terminal device can continue to use the same terminal identification information. This prevents a dead number from occurring in the terminal identification information due to setting of an assignment range of terminal identification information for each network, and therefore, efficiency of use of resources such as a memory can be improved.

(15) A wireless terminal device according to an embodiment of the present disclosure is driven by electric power stored in a power storage unit, and includes: a data creation unit configured to create measurement information indicating a result of measurement by a sensor; and a communication unit configured to transmit a radio signal including the measurement information created by the data creation unit or other information. The communication unit performs one-way communication in a first period, transmits the measurement information in the first period, performs bidirectional communication in a second period different from the first period, and transmits the other information in the second period.

With this configuration, switching between the one-way communication and the bidirectional communication can be achieved according to information to be transmitted. In addition, since information other than the result of measurement by the sensor is transmitted/received through the bidirectional communication, it is possible to transmit setting information of the sensor, firmware update information, etc., from the management device to the wireless terminal device. This makes it unnecessary to visit a site where the wireless terminal device is installed, and change settings or the like. In addition, since a switch, etc., for setting of the wireless terminal device can be dispensed with, the cost of the wireless terminal device can be reduced. Therefore, an excellent system for transmitting the result of measurement by the sensor from the wireless terminal device to the management device, can be constructed.

(16) A communication control method according to an embodiment of the present disclosure is performed in a wireless sensor system including: a wireless terminal device driven by electric power stored in a power storage unit; and a management device configured to receive information transmitted from the wireless terminal device. The method includes: by the wireless terminal device, performing one-way communication in a first period, and transmitting, in the first period, measurement information indicating a result of measurement of a sensor; and by the wireless terminal device, performing bidirectional communication in a second period different form the first period, and transmitting other information in the second period.

With this configuration, switching between the one-way communication and the bidirectional communication can be achieved according to information to be transmitted. In addition, since information other than the result of measurement by the sensor is transmitted/received through the bidirectional communication, it is possible to transmit setting information of the sensor, firmware update information, etc., from the management device to the wireless terminal device. This makes it unnecessary to visit a site where the wireless terminal device is installed and change settings or the like. In addition, since a switch, etc., for setting of the wireless terminal device can be dispensed with, the cost of the wireless terminal device can be reduced. Therefore, an excellent system for transmitting the result of measurement by the sensor from the wireless terminal device to the management device, can be constructed.

(17) A communication control program according to an embodiment of the present disclosure is used in a wireless terminal device driven by electric power stored in a power storage unit. The program causes a computer to function as: a data creation unit configured to create measurement information indicating a result of measurement by a sensor; and a communication unit configured to transmit a radio signal including the measurement information by one-way communication. The communication unit performs one-way communication in a first period, transmits the measurement information in the first period, performs bidirectional communication in a second period different from the first period, and transmits other information in the second period.

With this configuration, switching between the one-way communication and the bidirectional communication can be achieved according to information to be transmitted. In addition, since information other than the result of measurement by the sensor is transmitted/received through the bidirectional communication, it is possible to transmit setting information of the sensor, firmware update information, etc., from the management device to the wireless terminal device. This makes it unnecessary to visit a site where the wireless terminal device is installed and change settings or the like. In addition, since a switch, etc., for setting of the wireless terminal device can be dispensed with, the cost of the wireless terminal device can be reduced. Therefore, an excellent system for transmitting the result of measurement by the sensor from the wireless terminal device to the management device, can be constructed.

(18) A wireless sensor system according to an embodiment of the present disclosure includes: a wireless terminal device which is driven by electric power stored in a power storage unit, and is configured to transmit measurement information indicating a result of measurement by a sensor: a relay device configured to relay information received from the wireless terminal device: and a management device configured to receive the measurement information relayed by the relay device. The wireless terminal device transmits a preparation request, the relay device receives the preparation request transmitted from the wireless terminal device, and relays the preparation request to the management device, the management device receives the preparation request relayed by the relay device, and transmits, to the relay device, setting information related to the wireless terminal device, the relay device receives and holds the setting information transmitted from the management device, after transmission of the preparation request, the wireless terminal device transitions to a first sleep state to stop a communication operation, and transmits a setting request after returning from the first sleep state, and the relay device receives the setting request transmitted from the wireless terminal device, and transmits the setting information held therein to the wireless terminal device.

With this configuration, the management device can transmit the setting information in response to the preparation request transmitted from the wireless terminal device, and therefore can transmit the setting information at a timing when the wireless terminal device requires the setting information, for example. In addition, the wireless terminal device transitions to the sleep state after the communication operation, and the relay device holds the setting content to be applied to the wireless terminal device. Therefore, the setting content to be applied can be more reliably reflected in the wireless terminal device while reducing power consumption of the wireless terminal device. Therefore, an excellent system for transmitting the result of measurement by the sensor from the wireless terminal device to the management device can be constructed.

(19) Preferably, the relay device receives the setting request transmitted from the wireless terminal device, then, if the relay device has not yet received the setting information from the management device, the relay device transmits predetermined information to the wireless terminal device.

With this configuration, when the setting information from the management device has not arrived at the relay device, the wireless terminal device receives the predetermined information and transitions to, for example, the sleep state, whereby an increase in power consumption due to waiting can be inhibited.

(20) More preferably, the wireless terminal device receives the predetermined information transmitted from the relay device, transitions to a second sleep state to stop the communication operation, and transmits the setting request to the relay device after returning from the second sleep state.

With this configuration, the setting information from the management device can be received more reliably while inhibiting increase in power consumption due to waiting in the wireless terminal device.

(21) Preferably, the relay device includes its own identification information in the preparation request, and transmits the preparation request to the management device.

With this configuration, since the management device can recognize the relay device that relays the preparation request from the wireless terminal device, the setting information can be more reliably transmitted to the wireless terminal device. In addition, since the management device can transmit the setting information while selecting the relay device, the transmission amount of data can be reduced as compared to the case where data are transmitted in parallel to a plurality of relay devices. Thus, smooth transmission of data can be achieved even in a transmission path having a small transmission capacity.

(22) Preferably, the wireless terminal device performs one-way communication in a first period, transmits the measurement information in the first period, performs bidirectional communication in a second period different from the first period, and transmits other information in the second period.

With this configuration, switching between the one-way communication and the bidirectional communication can be achieved according to information to be transmitted, for example. In addition, since information other than the result of measurement by the sensor is transmitted/received through the bidirectional communication, it is possible to transmit setting information of the sensor, firmware update information, etc., from the management device to the wireless terminal device. This makes it unnecessary to go to a site where the wireless terminal device is installed and change settings or the like. In addition, since a switch, etc., for setting of the wireless terminal device can be dispensed with, the cost of the wireless terminal device can be reduced.

(23) Preferably, the wireless sensor system further includes a relay device configured to relay information received from the wireless terminal device. The wireless terminal device performs a connection process of establishing communication connection with the relay device. In the connection process, the wireless terminal device is able to select a plurality of data rates, and determines whether or not to be communicable with the relay device for each of the data rates in a descending order.

The configuration of selecting the higher data rate results in a reduction in time required for data transmission, whereby power consumption can be reduced, for example.

(24) More preferably, the wireless terminal device, in the connection process, is able to select a plurality of channels, and determines whether or not to be communicable with the relay device while switching the channels with the data rates being fixed.

The configuration of selecting a communicable channel while maintaining the data rate realizes data transmission at a higher data rate.

(25) A communication control method according to an embodiment of the present disclosure is performed in a wireless sensor system including: a wireless terminal device which is driven by electric power stored in a power storage unit and is configured to transmit measurement information indicating a result of measurement by a sensor; a relay device configured to relay the information received from the wireless terminal device; and a management device configured to receive the measurement information relayed by the relay device. The method includes; by the wireless terminal device, transmitting a preparation request: by the relay device, receiving the preparation request transmitted from the wireless terminal device, and relaying the preparation request to the management device; by the management device, receiving the preparation request relayed by the relay device, and transmitting setting information related to the wireless terminal device to the relay device; by the relay device, receiving and holding the setting information transmitted from the management device; by the wireless terminal device, transitioning to a first sleep state to stop a communication operation, after transmission of the preparation request; by the wireless terminal device, transmitting a setting request after returning from the first sleep state; and by the relay device, receiving the setting request transmitted from the wireless terminal device, and transmitting the setting information held therein to the wireless terminal device.

With this configuration, the management device can transmit the setting information in response to the preparation request transmitted from the wireless terminal device, and therefore can transmit the setting information at a timing when the wireless terminal device requires the setting information, for example. In addition, the wireless terminal device transitions to the sleep state after the communication operation, and the relay device holds the setting content to be applied to the wireless terminal device. Therefore, the setting content to be applied can be more reliably reflected in the wireless terminal device while reducing power consumption of the wireless terminal device. Therefore, an excellent system for transmitting the result of measurement by the sensor from the wireless terminal device to the management device, can be constructed.

(26) A wireless sensor system according to an embodiment of the present disclosure includes: one or a plurality of wireless terminal devices each being driven by electric power stored in a power storage unit, and being configured to transmit measurement information indicating a result of measurement by a sensor: a plurality of lower-order management devices configured to receive the measurement information transmitted from the wireless terminal devices; and a higher-order management device configured to be communicable with each lower-order management device. The higher-order management device assigns, to each wireless terminal device, terminal identification information having a shorter data length than unique identification information, of the wireless terminal device, which is registered therein, and the wireless terminal device includes, in the measurement information, the terminal identification information assigned by the higher-order management device, and transmits the measurement information.

With this configuration, the transmission amount of data can be reduced. In addition, since the management device unitarily manages the terminal identification information, overlapping of the terminal identification information can be avoided in contrast to the case where, for example, terminal identification information is determined and assigned to each of networks under control of the same management device. Therefore, even when the wireless terminal device moves to another network under control of the same management device, the wireless terminal device can continue to use the same terminal identification information. This prevents a dead number from occurring in the terminal identification information due to setting of an assignment range of terminal identification information for each network, and therefore, efficiency of use of resources such as a memory can be improved. Therefore, an excellent system for transmitting the result of measurement by the sensor from the wireless terminal device to the management device, can be constructed.

(27) Preferably, each lower-order management device transmits, to another device, the measurement information obtained by changing the terminal identification information included in the measurement information transmitted from the wireless terminal device, to the corresponding unique identification information.

With this configuration, for example, the measurement information can be transmitted from the lower-order management device to another device that cannot process the terminal identification information.

(28) A wireless sensor system according to an embodiment of the present disclosure includes: one or a plurality of wireless terminal devices each being driven by electric power stored in a power storage unit, and being configured to transmit measurement information indicating a result of measurement by a sensor; a plurality of lower-order management devices configured to receive the measurement information transmitted from the wireless terminal devices; and a higher-order management device configured to be communicable with each lower-order management device. The higher-order management device assigns, to each wireless terminal device, identification information that allows identification of a format of the measurement information, and the wireless terminal device includes, in the measurement information, the identification information assigned by the higher-order management device, and transmits the measurement information.

As described above, since the management device unitarily manages the identification information, overlapping of the identification information can be avoided in contrast to the case where, for example, identification information is determined and assigned to each of networks under control of the same management device. Therefore, even when the wireless terminal device moves to another network under control of the same management device, the wireless terminal device can continue to use the same identification information. This prevents a dead number from occurring in the identification information due to setting of an assignment range of identification information for each network, and therefore, efficiency of use of resources such as a memory can be improved. In addition, since the wireless terminal device transmits information indicating the setting content thereof, the management device can easily determine whether or not the setting content of the wireless terminal device is appropriate. Furthermore, since the identification information is included in the measurement information, the communication operation can be simplified. Therefore, an excellent system for transmitting the result of measurement by the sensor from the wireless terminal device to the management device, can be constructed.

(29) A communication control method according to an embodiment of the present disclosure is performed in a wireless sensor system including: one or a plurality of wireless terminal devices each being driven by electric power stored in a power storage unit and being configured to transmit measurement information indicating a result of measurement by a sensor; a plurality of lower-order management devices configured to receive the measurement information transmitted from the wireless terminal devices: and a higher-order management device configured to be communicable with each lower-order management device. The method includes: by the higher-order management device, assigning, to each wireless terminal device, terminal identification information having a shorter data length than unique identification information, of the wireless terminal device, which is registered in the higher-order management device; and by each wireless terminal device, including the assigned terminal identification information in the measurement information, and transmitting the measurement information.

With this configuration, the transmission amount of data can be reduced. In addition, since the management device unitarily manages the terminal identification information, overlapping of the terminal identification information can be avoided in contrast to the case where, for example, terminal identification information is determined and assigned to each of networks under control of the same management device. Therefore, even w % ben the wireless terminal device moves to another network under control of the management device, the wireless terminal device can continue to use the same terminal identification information. This prevents a dead number from occurring in the terminal identification information due to setting of an assignment range of terminal identification information for each network, and therefore, efficiency of use of resources such as a memory can be improved. Therefore, an excellent system for transmitting the result of measurement by the sensor from the wireless terminal device to the management device, can be constructed.

(30) A communication control method according to an embodiment of the present disclosure is performed in a wireless sensor system including: one or a plurality of wireless terminal devices each being driven by electric power stored in a power storage unit and being configured to transmit measurement information indicating a result of measurement by a sensor; a plurality of lower-order management devices configured to receive the measurement information transmitted from the wireless terminal devices; and a higher-order management device configured to be communicable with each lower-order management device. The method includes: by the higher-order management device, assigning, to each wireless terminal device, identification information that allows identification of a format of the measurement information; and by each wireless terminal device, including the identification information assigned by the higher-order management device in the measurement information, and transmitting the measurement information.

As described above, since the management device unitarily manages the identification information, overlapping of the terminal identification information can be avoided in contrast to the case where, for example, terminal identification information is determined and assigned to each of networks under control of the same management device.

Therefore, even when the wireless terminal device moves to another network under control of the same management device, the wireless terminal device can continue to use the same terminal identification information. This prevents a dead number from occurring in the terminal identification information due to setting of an assignment range of terminal identification information for each network, and therefore, efficiency of use of resources such as a memory can be improved. In addition, since the wireless terminal device transmits information indicating the setting content thereof, the management device can easily determine whether or not the setting content of the wireless terminal device is appropriate. Furthermore, since the identification information is included in the measurement information, the communication operation can be simplified. Therefore, an excellent system for transmitting the result of measurement by the sensor from the wireless terminal device to the management device, can be constructed.

Hereinafter, embodiments of the present disclosure will be described with reference to the drawings. In the drawings, the same or corresponding parts are denoted by the same reference signs, and the descriptions thereof are not repeated. At least some parts of the embodiments described below can be combined together as desired.

FIG. 1 shows a configuration of a wireless sensor system according to an embodiment of the present disclosure.

With reference to FIG. 1, a wireless sensor system 301 includes a plurality of sensor modules 1, a plurality of relay devices 151, a higher-order management device 161, and a plurality of lower-order management devices 171.

The wireless sensor system 301 may not necessarily include a plurality of sensor modules 1, and may include one sensor module 1. The wireless sensor system 301 may not necessarily include a plurality of relay devices 151, and may include one relay device 151. The wireless sensor system 301 may not necessarily include a plurality of lower-order management devices 171, and may include one lower-order management device 171.

Each relay device 151 is an access point, for example. The higher-order management device 161 and each lower-order management device 171 are servers, for example.

The relay devices 151, the higher-order management device 161, and the lower-order management devices 171 are operated by electric power from a power system, for example.

Each lower-order management device 171 manages a sub-network including one or a plurality of relay devices 151 and one or a plurality of sensor modules 1.

In the wireless sensor system 301, each relay device 151 receives measurement information indicating a result of measurement by a sensor module 1 including a sensor, from the sensor module 1 or another relay device 151, and relays the measurement information to a lower-order management device 171 that manages a sub-network to which the relay device 151 belongs.

The lower-order management device 171 transmits the measurement information received from the relay device 151, to a cloud server 181, for example.

Communication between the sensor module 1 and the relay device 151 is performed by, for example, wireless multi-hop communication using a communication protocol such as ZigBee based on IEEE 802.15.4, Bluetooth (registered trademark) based on IEEE 802.15.1, or UWB (Ultra Wide Band) based on IEEE802.15.3a. Communication protocols other than those mentioned above may be used.

Communication between the relay device 151 and the lower-order management device 171 is performed by wireless communication, for example. Communication between the relay device 151 and the lower-order management device 171 may be performed by wired communication.

Communication between the lower-order management device 171 and the cloud server 181 is performed by wired communication, for example.

Communication between the lower-order management device 171 and the higher-order management device 161 is performed by wired communication, for example. Communication between the lower-order management device 171 and the higher-order management device 161 may be performed by wireless communication.

[Configuration of Sensor Module 1]

Figure 2:
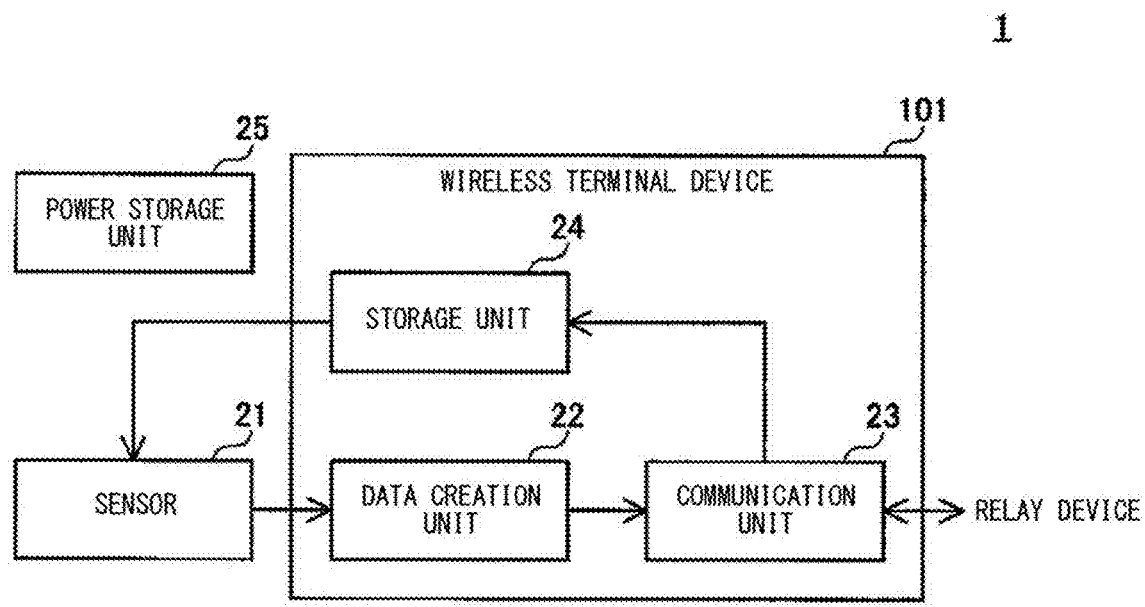
FIG. 2 shows a configuration of a sensor module in the wireless sensor system according to the embodiment of the present disclosure.

FIG. 2 shows a configuration of a sensor module in the wireless sensor system according to the embodiment of the present disclosure.

With reference to FIG. 2, the sensor module 1 includes a sensor 21, and a wireless terminal device 101. The wireless terminal device 101 includes a data creation unit 22, a communication unit 23, a storage unit 24, and a power storage unit 25.

The sensor module 1 is driven by electric power stored in the power storage unit 25, for example. The power storage unit 25 is a power storage device including a primary battery, a secondary battery, a solar cell, a capacitor, or the like, for example. The power storage unit 25 stores energy therein, and supplies power to the sensor 21, the wireless terminal device 101, and circuits in the sensor module 1, by using the stored energy.

The wireless terminal device 101 performs one-way communication in a first period, and transmits measurement information indicating the result of measurement by the sensor 21.

In more detail, the sensor 21 in the sensor module 1 measures at least one of physical quantities such as temperature, humidity, current, acceleration, gyro value, pressure, etc., for example, and transmits an analog signal indicating the measured physical quantity, to the data creation unit 22.

The data creation unit 22 creates measurement information indicating the result of measurement by the sensor 21. In more detail, the data creation unit 22 receives the analog signal from the sensor 21, performs AD (Analog Digital) conversion on the received analog signal to calculate a sensor measurement value, creates measurement information including the sensor measurement value, and outputs the measurement information to the communication unit 23.

The communication unit 23 transmits a radio signal including the measurement information received from the data creation unit 22 to, for example, a relay device 151, through one-way communication. Other than the relay device 151, a radio signal including various information transmitted from the communication unit 23 may arrive at the lower-order management device 171 or the higher-order management device 161.

Problems

PATENT LITERATURE 1 (Japanese Laid-Open Patent Publication No. 2009-261013) discloses a method of transmitting, from a base station, a response to data received from a wireless terminal device and other information to be transmitted to the wireless terminal device.

In this method, however, when the wireless terminal device has transmitted the data to the base station, the wireless terminal device has to wait for a response from the base station, which results in an increase in power consumption.

Meanwhile, when an asynchronous communication network is constructed, it is difficult for a wireless terminal device to grasp a transmission timing of data to itself due to a difference in delay time or the like required for data processing. Therefore, the wireless terminal device needs to set a sufficient waiting time until receiving data from the base station, in a period during which bidirectional communication is performed, which results in an increase in power consumption.

Meanwhile, PATENT LITERATURE 2 (Japanese Laid-Open Patent Publication No. 2011-109338) discloses a management system for managing a plurality of wireless equipment in a communication network. This management system uses a first ID (Identification) unique to each wireless equipment, and a second ID having less amount of information than the first ID.

In this method, however, since a range of second IDs usable in each network is set in advance, it is difficult to efficiently use resources such as a memory.

The wireless sensor system according to the embodiment of the present disclosure solves the above problems by the following configurations and operations.

The wireless terminal device 101 performs bidirectional communication in a second period different from the first period in which one-way communication is performed, and transmits other information in the second period to the relay device 151, for example. For example, the wireless terminal device 101 uses different channels for the one-way communication and the bidirectional communication.

The "one-way communication" is, for example, a communication in which data transmitted from a transmitting side is merely received by a receiving side, so that the transmitting side and the receiving side cannot be switched to bidirectionally exchange data. Meanwhile, the "bidirectional communication" is, for example, a communication in which the direction of data transmission is not fixed, so that the transmitting side and the receiving side can be switched with each other to exchange data. That is, the wireless terminal device 101 cannot receive data during the first period but can receive data during the second period.

Figure 3:
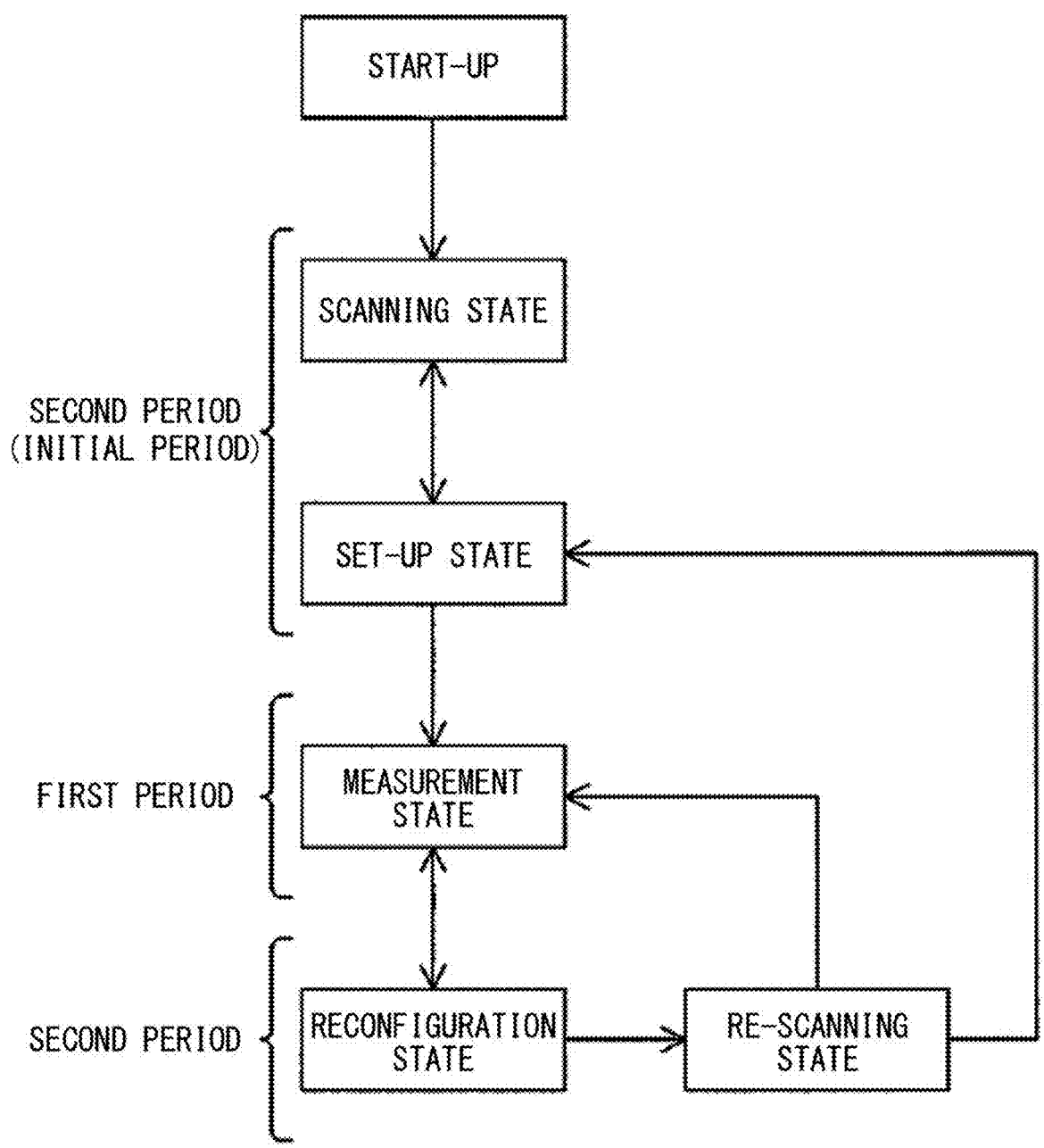
FIG. 3 shows an example of state transition of a wireless terminal device in the wireless sensor system according to the embodiment of the present disclosure.

FIG. 3 shows an example of state transition of a wireless terminal device in the wireless sensor system according to the embodiment of the present disclosure.

With reference to FIG. 3, the wireless terminal device 101 performs an initialization process during an initial period that exists from when the wireless terminal device 101 starts up to when the first period is started, and thereafter transitions to a scanning state. The initial period during which the wireless terminal device 101 enters the scanning state is one example of the second period.

For example, the wireless terminal device 101, in the scanning state, performs a connection process of establishing communication connection with the relay device 151.

Each device in the wireless sensor system 301 includes a computer. An arithmetic processing unit such as a CPU in the computer reads out, from a memory (not shown), a program including part or all of steps in the sequence diagram or flow chart described below, and executes the program. The programs of the plurality of devices can be installed from outside. The programs of the plurality of devices are each distributed in a state of being stored in a storage medium.

Figure 4:
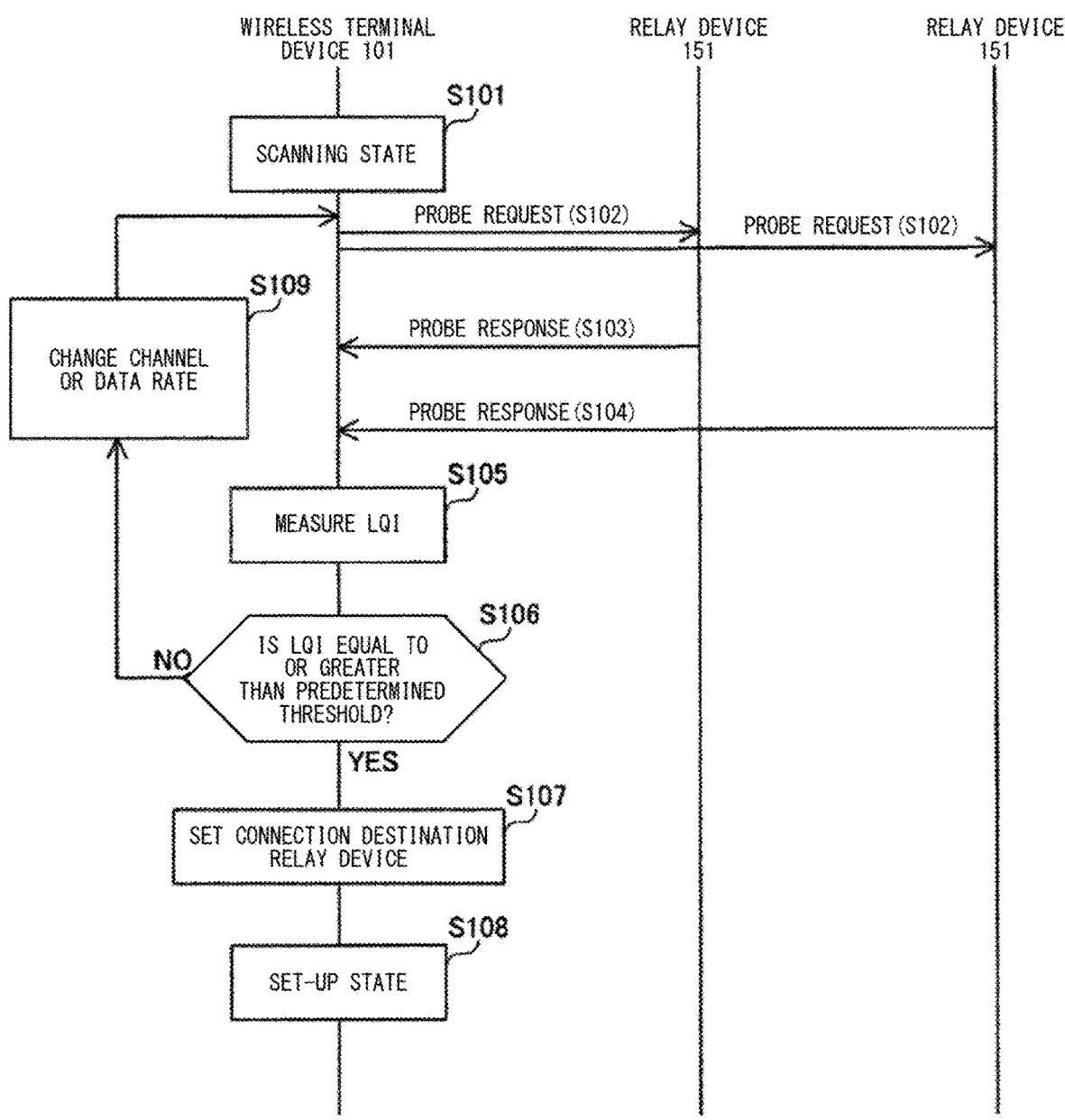
FIG. 4 shows a sequence of a connection process performed by the wireless terminal device in the wireless sensor system according to the embodiment of the present disclosure.

FIG. 4 shows a sequence of a connection process performed by a wireless terminal device in the wireless sensor system according to the embodiment of the present disclosure. FIG. 4 shows an operation of the wireless sensor system 301 including two relay devices 151.

With reference to FIG. 4, firstly, the wireless terminal device 101 transitions to the scanning state (step S101), and transmits a probe request to the two relay devices 151.

Specifically, the communication unit 23 in the wireless terminal device 101 transmits a radio signal including the probe request to the two relay devices 151.

FIG. 5 shows an example of a data format of a probe request transmitted by a wireless terminal device in the wireless sensor system according to the embodiment of the present disclosure.

With reference to FIG. 5, the probe request is composed of fields corresponding to a PHY header, a MAC header, and a message type in this order from the beginning.

The communication unit 23 transmits a radio signal including a probe request in which a broadcast address is set as a destination in the MAC header, lower two bytes or the like of its own serial number (hereinafter also referred to as "sensor ID") are set as a transmission source in the MAC header, and an identifier indicating that it is a probe request is set in the field corresponding to the message type.

Thus, the wireless terminal device 101 broadcasts the radio signal including the probe request, thereby searching for a relay device 151 that is communicable (step S102).

Next, each relay device 151 receives the probe request transmitted from the wireless terminal device 101, and transmits a probe response to the wireless terminal device 101.

The data format of the probe response is the same as the data format of the probe request shown in FIG. 5. Each relay device 151 transmits a radio signal including the probe response in which a broadcast address is set as a destination in the MAC header, its own ID or the like is set as a transmission source in the MAC header, and an identifier indicating that it is a probe response is set in the field corresponding to the message type.

Thus, the relay device 151 broadcasts the radio signal including the probe response, whereby the relay device 151 can simultaneously respond to probe requests from a plurality of wireless terminal devices 101 (step S103 and step S104).

Next, the wireless terminal device 101 receives the probe response transmitted from each relay device 151, and measures an LQI of each radio signal including the received probe response.

For example, in the connection process, the wireless terminal device 101 can select a plurality of data rates, and determines whether or not to be communicable with the relay devices 151 for each of the data rates in a descending order. For example, in the connection process, the wireless terminal device 101 can select a plurality of channels, i.e., frequency bands of a radio signal to be transmitted, and determines whether or not to be communicable with the relay device 151 while switching the channels with the data rates being fixed.

In more detail, when a radio signal having a measured LQI value equal to or higher than a predetermined threshold value is present among the received radio signals including the probe responses (YES in step S106), the communication unit 23 sets, as a connection destination relay device, the relay device 151 corresponding to the transmission source included in the probe response included in the radio signal, and ends the connection process (step S107). Then, the wireless terminal device 101 transitions from the scanning state to a setup state during the initial period (step S108).

Meanwhile, when a radio signal having a measured LQI value equal to or higher than the predetermined threshold value is not present (NO in step S106), the wireless terminal device 101 changes the channel of the radio signal including the probe request (step S109), and transmits the probe request to the two relay devices 151 (step S102).

When a radio signal having a measured LQI value equal to or higher than the predetermined threshold value is not present in any channel at a certain data rate, the wireless terminal device 101 changes the data rate of the radio signal including the probe request, and transmits the probe request to the two relay devices 151.

In more detail, when a radio signal having a measured LQI value equal to or higher than the predetermined threshold value is not present among the received radio signals including the probe responses (NO in step S106), the communication unit 23 changes the data rate to be lower than the present set value (step S109), and transmits a radio signal including the probe request with the changed data rate (step S102).

In the setup state, the wireless terminal device 101 transmits a preparation request including setting information, of the sensor module 1, which is registered in advance.

FIG. 6 shows an example of a data format of a preparation request transmitted by a wireless terminal device in the wireless sensor system according to the embodiment of the present disclosure.

With reference to FIG. 6, the preparation request is composed of fields corresponding to a PHY header, a MAC header, a message type, a true sensor ID, a firmware version, and setting information, in this order from the beginning.

The communication unit 23 in the wireless terminal device 101 sets an ID of a connection destination relay device (hereinafter also referred to as "connection destination relay device ID") as a destination in the MAC header, sets a sensor ID as a transmission source in the MAC header, and sets an identifier indicating that it is a preparation request in the field corresponding to the message type.

In addition, the communication unit 23 includes, in the preparation request, its own serial number as a true sensor ID, a firmware version of the sensor module 1 to which the communication unit 23 belongs, and setting information S1 of the sensor module 1, and transmits a radio signal including the preparation request to the connection destination relay device.

The setting information of the sensor module 1 includes a resetting cycle indicating the length of the first period, and a transmission cycle indicating a timing to transmit a radio signal including measurement information in the first period.

In addition, the setting information of the sensor module 1 includes: a one-way communication channel indicating a channel to be used for transmission of a radio signal including measurement information; a transmission data rate indicating a data rate of the radio signal including the measurement information; a bidirectional communication channel indicating a combination of channels (e.g., 0 ch and 1 ch) to be used for transmission/reception of a radio signal when performing a connection process; and a bidirectional communication data rate indicating a combination of data rates (e.g., 100 kbps and 1.2 kbps) of radio signals when performing a connection process.

The setting information of the sensor module 1 further includes, for example, a sensor type indicating the type of the sensor module 1, various sensor parameters such as a clamping number according to the type of the sensor module 1, and a data format of measurement information according to the various sensor parameters.

The connection destination relay device receives the radio signal including the preparation request transmitted from the wireless terminal device 101, creates a radio signal including an ACK that acknowledges reception of the radio signal, and transmits the created radio signal to the wireless terminal device 101.

After transmission of the radio signal including the preparation request, when receiving the radio signal including the ACK from the connection destination relay device, the wireless terminal device 10 transitions to a sleep state to stop the communication operation. In the sleep state, the wireless terminal device 101 stops at least the receiving operation.

[Configuration of Relay Device 151]

Figure 7:
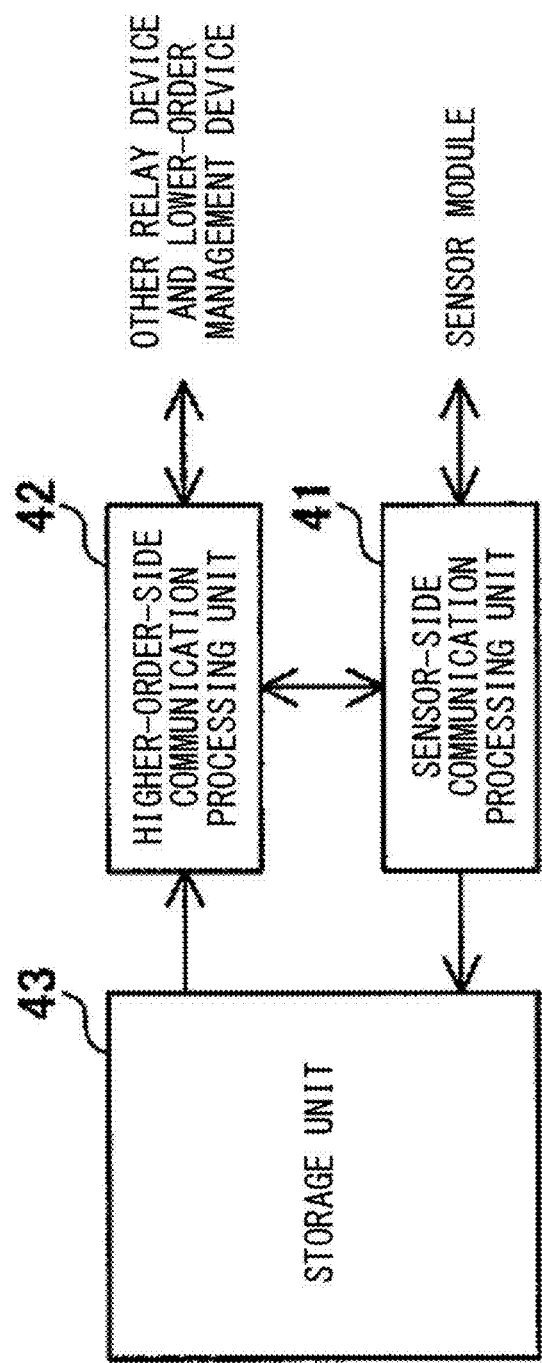
FIG. 7 shows a configuration of a relay device in the wireless sensor system according to the embodiment of the present disclosure.

FIG. 7 shows a configuration of a relay device in the wireless sensor system according to the embodiment of the present disclosure.

With reference to FIG. 7, the relay device 151 includes a sensor-side communication processing unit 41, a higher-order-side communication processing unit 42, and a storage unit 43.

A connection destination relay device receives a radio signal including a preparation request transmitted from a wireless terminal device 101, according to AODV (Ad hoc On-Demand Distance Vector) routing protocol, and relays the preparation request included in the received radio signal to the lower-order management device 171 by using a radio signal in the same channel.

The connection destination relay device may relay the preparation request to a lower-order management device 171 via another relay device 151.

[Configuration of Lower-Order Management Device 171]

Figure 8:
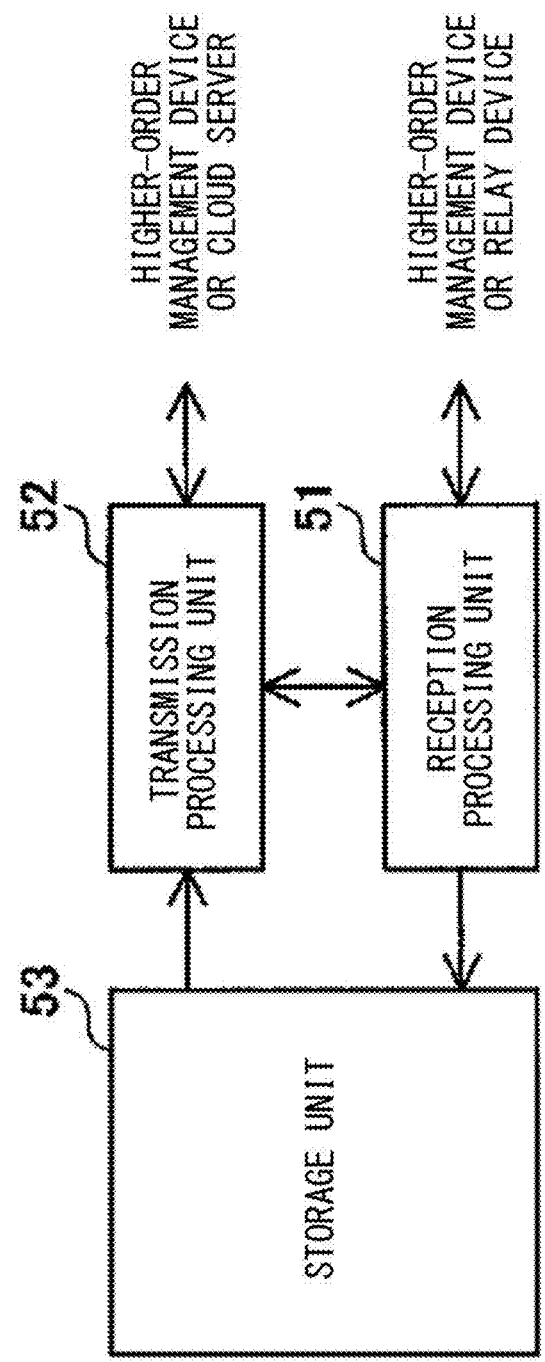
FIG. 8 shows a configuration of a lower-order management device in the wireless sensor system according to the embodiment of the present disclosure.

FIG. 8 shows a configuration of a lower-order management device in the wireless sensor system according to the embodiment of the present disclosure.

With reference to FIG. 8, the lower-order management device 171 includes a reception processing unit 51, a transmission processing unit 52, and a storage unit 53.

The reception processing unit 51 in the lower-order management device 171 receives a radio signal including a preparation request transmitted from a wireless terminal device 101 via a connection destination relay device, and outputs the preparation request included in the received radio signal to the transmission processing unit 52.

The transmission processing unit 52 receives the preparation request from the reception processing unit 51, changes the destination in the MAC header of the preparation request to the ID of the higher-order management device 161, and transmits the preparation request to the higher-order management device 161.

[Configuration of Higher-Order Management Device 161]

Figure 9:
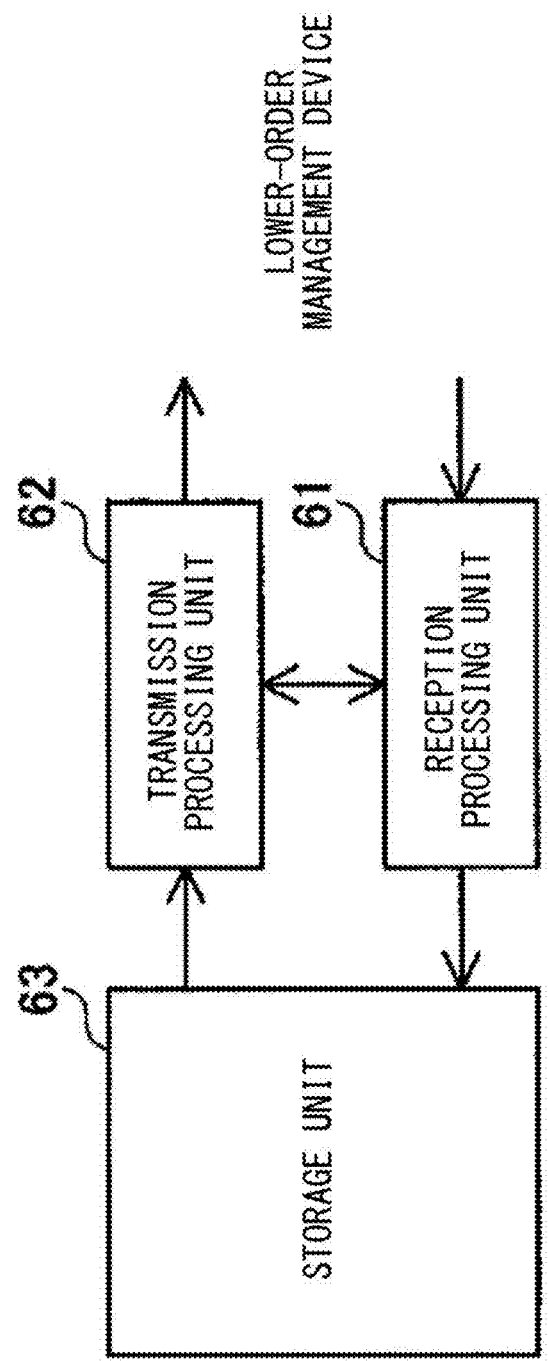
FIG. 9 shows a configuration of a higher-order management device in the wireless sensor system according to the embodiment of the present disclosure.

FIG. 9 shows a configuration of a higher-order management device in the wireless sensor system according to the embodiment of the present disclosure.

With reference to FIG. 9, the higher-order management device 161 includes a reception processing unit 61, a transmission processing unit 62, and a storage unit 63.

The reception processing unit 61 in the higher-order management device 161 receives a preparation request transmitted from the lower-order management device 171.

FIG. 10 shows an example of a configuration table held by a higher-order management device in the wireless sensor system according to the embodiment of the present disclosure.

With reference to FIG. 10, the reception processing unit 61 manages, by using identification information, a true sensor ID, a firmware version, and setting information S1 which are included in the preparation request.

In more detail, in order to manage a true sensor ID, a connection destination relay device ID, a firmware version, and setting information S1 in association with each other, the reception processing unit 61 assigns, as identification number, a configuration number (serial number) to a set of the true sensor ID, the connection destination relay device ID, the firmware version, and the setting information S1. This configuration number allows identification of a format of measurement information.

In addition, the reception processing unit 61 assigns, to a wireless terminal device 101, terminal identification information having a shorter data length than unique identification information that is assigned in advance to the corresponding wireless terminal device 101.

In more detail, the reception processing unit 61 registers, for example, the true sensor ID included in the preparation request, as the unique identification information of the corresponding wireless terminal device 101, and assigns a 2-byte provisional sensor ID having a shorter data length than the true sensor ID as the terminal identification information to the corresponding wireless terminal device 101. The higher-order management device 161 unitarily manages the sensor ID and the provisional sensor ID.

Figure 11:
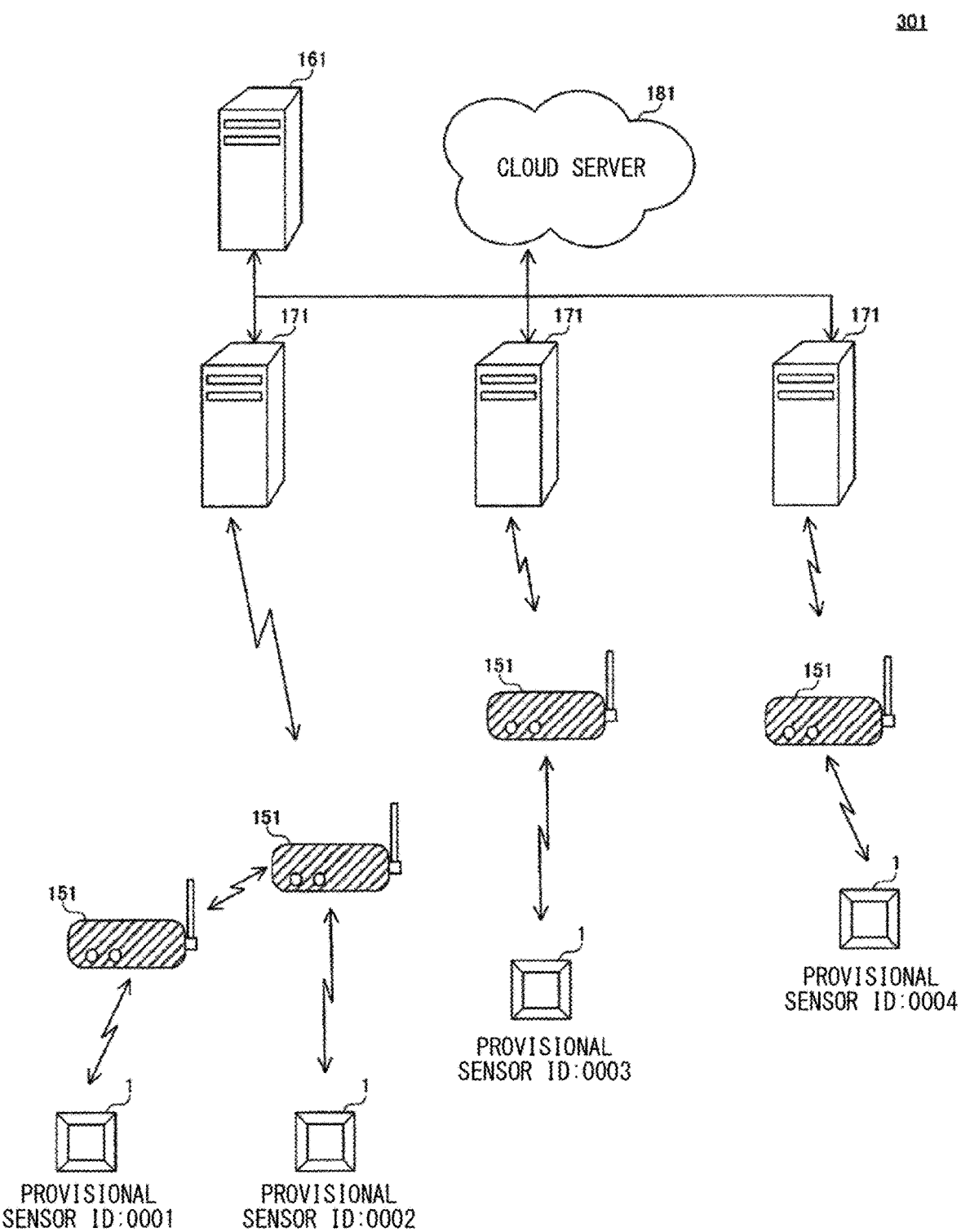
FIG. 11 shows examples of provisional sensor IDs assigned to wireless terminal devices by the higher-order management device in the wireless sensor system according to the embodiment of the present disclosure.

FIG. 11 shows examples of provisional sensor IDs assigned to the respective wireless terminal devices by the higher-order management device in the wireless sensor system according to the embodiment of the present disclosure.

With reference to FIG. 11, the higher-order management device 161 assigns, to each sensor module 1, a provisional sensor ID that does not overlap with provisional sensor IDs of other sensor modules 1, regardless of to which sub-network the sensor module 1 belongs.

Then, the reception processing unit 61 creates or updates a configuration table representing correspondence relationship between a true sensor ID, a provisional sensor ID, a configuration number, a firmware version, and setting information S1, and stores the created or updated configuration table in the storage unit 63.

The higher-order management device 161 stores, in advance, in the storage unit 63, the true sensor ID, the provisional sensor ID, the firmware version and setting information S2 to be applied to the sensor module 1, and the configuration number in association with each other.

The transmission processing unit 62 transmits setting information related to a wireless terminal device 101 to a lower-order management device 171 that manages a sub-network to which the wireless terminal device 101 belongs.

In more detail, when the reception processing unit 61 has created or updated the configuration table, the transmission processing unit 62 compares a configuration number CN1 corresponding to the setting information S1 with a configuration number CN2 corresponding to the setting information S2 in the storage unit 63.

For example, when the configuration numbers are different from each other, the transmission processing unit 62 selectively transmits: the configuration number CN2 and the corresponding provisional sensor ID; and a content, out of the contents of the setting information S2 to be newly applied to the wireless terminal device 101, which is different from the received setting information S1, to the wireless terminal device 101 having the provisional sensor ID.

In more detail, when the configuration number CN1 and the configuration number CN2 are different from each other, the transmission processing unit 62 acquires, as difference information, the content of an item, out of the items of the setting information S2 stored in the storage unit 63, which has a set value different from the setting information S1, and creates a response signal including the acquired difference information.

The transmission processing unit 62 transmits the configuration number and the provisional sensor ID to the wireless terminal device 101, regardless of whether or not there is a content, out of the contents of the setting information S2 to be newly applied to the sensor module 1, which is different from the setting information S1 received from the wireless terminal device 101.

In more detail, when the configuration number CN1 and the configuration number CN2 coincide with each other, the transmission processing unit 62 creates a response signal without acquiring the setting information S2 stored in the storage unit 63. In this case, the transmission processing unit 62 includes, in the response signal, the corresponding true sensor ID, the corresponding provisional sensor ID, the configuration number CN2, and NULL, i.e., null data.

The reception processing unit 61 may not necessarily assign the configuration number to the set of the true sensor ID, the connection destination relay device ID, the firmware version, and the setting information S1 which are included in the preparation request.

In this case, the reception processing unit 61 acquires the true sensor ID, the connection destination relay device ID, the firmware version, and the setting information S1 from the preparation request, and assigns the provisional sensor ID corresponding to the acquired true sensor ID, to the corresponding wireless terminal device 101.

Then, the reception processing unit 61 compares the acquired setting information S1 with the setting information S2, held in the storage unit 63, to be applied to the sensor module 1 corresponding to the acquired true sensor ID. When the setting information S1 and the setting information S2 coincide with each other, the reception processing unit 61 acquires the configuration number CN2 corresponding to the setting information S2 from the storage unit 63, and outputs the acquired configuration number CN2, the true sensor ID acquired from the preparation request, and the assigned provisional sensor ID to the transmission processing unit 62.

The transmission processing unit 62 creates a response signal including the configuration number CN2, the true sensor ID, and the provisional sensor ID which are received from the reception processing unit 61.

Meanwhile, when the setting information S1 and the setting information S2 do not coincide with each other, the reception processing unit 61 acquires, from the storage unit 63, the configuration number CN2 corresponding to the setting information S2, and the content of an item having a set value different from the setting information S1, as difference information, and outputs the acquired configuration number CN2 and difference information, the true sensor ID acquired from the aforementioned preparation request, and the assigned provisional sensor ID to the transmission processing unit 62.

The transmission processing unit 62 creates a response signal including the configuration number CN2, the difference information, the true sensor ID, and the provisional sensor ID which are received from the reception processing unit 61.

Then, the transmission processing unit 62 transmits the response signal to the lower-order management device 171.

The reception processing unit 51 in the lower-order management device 171 receives the response signal transmitted from the higher-order management device 161, and outputs the received response signal to the transmission processing unit 52.

The transmission processing unit 52 relays the response signal received from the reception processing unit 51 to the connection destination relay device, according to the AODV routing protocol, for example.

The lower-order management device 171 may relay the response signal to the connection destination relay device via another relay device 151.

The higher-order-side communication processing unit 42 in the connection destination relay device receives, via the lower-order management device 171, the response signal transmitted from the higher-order management device 161, and stores, in the storage unit 43, the various information (hereinafter also referred to as "terminal information") included in the received response signal With reference to FIG. 3, the wireless terminal device 101 in the setup state transitions to, for example, the sleep state and returns from the sleep state after a predetermined time has passed from the transition to the sleep state, and thereafter, transmits a setting request.

The data format of the setting request is the same as the data format of the probe request shown in FIG. 5, and is composed of fields corresponding to a PHY header, a MAC header, and a message type, in this order from the beginning.

The communication unit 23 in the wireless terminal device 101 transmits, to the connection destination relay device, a radio signal including a setting request in which a connection destination relay device ID is set as a destination in the MAC header, a sensor ID is set as a transmission source in the MAC header, and an identifier indicating that it is a setting request is set in the field corresponding to the message type.

The connection destination relay device receives the radio signal including the setting request transmitted from the wireless terminal device 101, creates a radio signal including an ACK that acknowledges reception of the radio signal, and transmits the created radio signal to the wireless terminal device 101.

Then, the connection destination relay device transmits, to the wireless terminal device 101, the setting information of the sensor module 1 included in the corresponding terminal information held therein.

In more detail, upon receiving the radio signal including the setting request transmitted from the wireless terminal device 101, the sensor-side communication processing unit 41 in the connection destination relay device refers to the sensor ID included in the setting request, acquires terminal information corresponding to the sensor ID, out of the terminal information stored in the storage unit 43, and creates a setting response.

FIG. 12 shows an example of a data format of a setting response transmitted by a relay device in the wireless sensor system according to the embodiment of the present disclosure.

With reference to FIG. 12, the setting response is composed of fields corresponding to a PHY header, a MAC header, a message type, a true sensor ID, a provisional sensor ID, a configuration number, and setting information, in this order from the beginning.

The sensor-side communication processing unit 41 sets a sensor ID as a destination in the MAC header, sets a connection destination relay device ID as a transmission source in the MAC header, and sets an identifier indicating that it is a setting response, in the field corresponding to the message type.

The sensor-side communication processing unit 41 sets the true sensor ID, the provisional sensor ID, the configuration number, and the setting information of the sensor module 1 which are included in the terminal information acquired from the storage unit 43, in the fields of the setting response corresponding to the true sensor ID, the provisional sensor ID, the configuration number, and the setting information, respectively. Then, the sensor-side communication processing unit 41 transmits a radio signal including the setting response, to the wireless terminal device 101 having the sensor ID. In addition, the sensor-side communication processing unit 41 outputs the setting response, to the higher-order-side communication processing unit 42.

The higher-order-side communication processing unit 42 changes the destination in the MAC header of the setting response received from the sensor-side communication processing unit 41, to the ID of the lower-order management device 171, and transmits a radio signal including the setting response after the change to the lower-order management device 171.

Like the higher-order management device 161, the lower-order management device 171 holds a configuration table in the storage unit 53. The reception processing unit 51 in the lower-order management device 171 receives the radio signal including the setting response transmitted from the connection destination relay device, and adds the various information included in the setting response, to the configuration table.

Meanwhile, the connection destination relay device receives the radio signal including the setting request transmitted from the wireless terminal device 101, then, if the connection destination relay device has not yet received, via the lower-order management device 171, the response signal transmitted from the higher-order management device 161, the connection destination relay device transmits a preparation failure notification to the wireless terminal device 101.

The data format of the preparation failure notification is the same as the data format of the probe request shown in FIG. 5, and is composed of fields corresponding to a PHY header, a MAC header, and a field corresponding to a message type, in this order from the beginning.

In more detail, the sensor-side communication processing unit 41 in the connection destination relay device transmits a radio signal including a preparation failure notification, in which a sensor ID is set as a destination in the MAC header, a connection destination relay device ID is set as a transmission source in the MAC header, and an identifier indicating that it is a preparation failure notification is set in the field corresponding to the message type, to the wireless terminal device 101 having the sensor ID.

Upon receiving the radio signal including the setting response transmitted from the connection destination relay device, the communication unit 23 in the wireless terminal device 101 stores, in the storage unit 24, the provisional sensor ID, the configuration number, and the setting information of the sensor module 1 which are included in the received setting response. Then, the communication unit 23 creates a radio signal including an ACK that acknowledges reception of the radio signal, and transmits the created radio signal to the connection destination relay device.

With reference to FIG. 3, when the setting information of the sensor module 1 stored in the storage unit 24 is difference information, the wireless terminal device 101 transitions from the setup state to a measurement state after the sensor module 1 has reflected the content of the difference information. When the setting information of the sensor module 1 stored in the storage unit 24 is NULL, the wireless terminal device 101 transitions from the setup state to the measurement state. A period during which the wireless terminal device 101 is in the measurement state is one example of the first period.

Meanwhile, upon receiving the radio signal including the preparation failure notification transmitted from the connection destination relay device, the wireless terminal device 101 transitions from the setup state to the scanning state. Then, the wireless terminal device 101 performs the connection process again. When the wireless terminal device 101 has received the radio signal including the preparation failure notification transmitted from the connection destination relay device, the wireless terminal device 101 may perform, a plurality of times, an operation of transition to the sleep state, returning from the sleep state after a predetermined time has passed from the transition to the sleep state, and transmitting the setting request.

The wireless terminal device 101 in the measurement state performs one-way communication, and transmits measurement information indicating a result of measurement by the sensor, to a relay device 151, for example.

In more detail, the wireless terminal device 101 transmits the measurement information according to the setting information of the sensor module 1 included in the received setting response, i.e., the setting information in which the content of the difference information is reflected.

The communication unit 23, for example, transmits the configuration number included in the received setting response, during the first period for transmitting the measurement information. For example, the communication unit 23 includes the configuration number in the measurement information and transmits the measurement information.

In more detail, the data creation unit 22 in the wireless terminal device 101 creates measurement information indicating a result of measurement by the sensor 21.

Specifically, the data creation unit 22 receives an analog signal from the sensor 21, and subjects the received analog signal to AD conversion to calculate a sensor measurement value. In addition, the data creation unit 22 acquires, from the storage unit 24, the configuration number corresponding to the setting information applied to the corresponding sensor module 1. Then, the data creation unit 22 outputs, to the communication unit 23, the measurement information including the calculated sensor measurement value and the acquired configuration number.

FIG. 13 shows an example of a data format of measurement information transmitted by a wireless terminal device in the wireless sensor system according to the embodiment of the present disclosure.

With reference to FIG. 13, the measurement information is composed of fields corresponding to a PHY header, a MAC header, a configuration number, and a sensor measurement value, in this order from the beginning.

The communication unit 23 sets a broadcast address as a destination in the MAC header and sets a provisional sensor ID as a transmission source in the MAC header in the measurement information received from the data creation unit 22, and transmits a radio signal including the measurement information.

After transmission of the radio signal, the wireless terminal device 101 transitions to the sleep state and returns from the sleep state after a predetermined time has passed from the transition to the sleep state, and thereafter transmits the measurement information.

A relay device 151 receives the radio signal including the measurement information transmitted from the wireless terminal device 101, and relays the radio signal to the lower-order management device 171.

The lower-order management device 171 receives the measurement information transmitted from the wireless terminal device 101 via the relay device 151, and processes the received measurement information by using a format corresponding to the configuration number included in the received measurement information.

In more detail, the reception processing unit 51 in the lower-order management device 171 receives the radio signal including the measurement information transmitted from the wireless terminal device 101, and acquires the provisional sensor ID, the configuration number, and the sensor measurement value included in the measurement information.

Then, the reception processing unit 51 performs a process, such as various arithmetic operations, on the sensor measurement value by using the format corresponding to the acquired configuration number, and stores, in the storage unit 53, the processed sensor measurement value, the provisional sensor ID, and the configuration number.

The lower-order management device 171 transmits the processed sensor measurement value, for example. The lower-order management device 171 transmits, for example, measurement information which is obtained by changing the provisional sensor ID included in the measurement information transmitted from the wireless terminal device 101 to the corresponding true sensor ID, to the cloud server 181, for example.

In more detail, the transmission processing unit 52 in the lower-order management device 171 acquires the sensor measurement value, the provisional sensor ID, and the configuration number which are stored in the storage unit 53.

Then, with reference to the configuration table stored in the storage unit 53, the transmission processing unit 52 acquires the true sensor ID of the wireless terminal device corresponding to the acquired provisional sensor ID.

The transmission processing unit 52 creates measurement information including the acquired true sensor ID, the sensor measurement value, and the configuration number, and transmits a signal including the created measurement information to the cloud server 181.

The wireless terminal device 101, in the measurement state, periodically transmits the measurement information according to the transmission cycle included in the setting information of the sensor module 1, and transitions from the measurement state to a reconfiguration state after a predetermined time has passed.

For example, the wireless terminal device 101 performs bidirectional communication in the second period that is periodically or non-periodically started after the initial period, and transmits other information in the second period to the relay device 151, for example. As one example, the wireless terminal device 101 transmits a configuration number in the second period.

In more detail, with reference to FIG. 3, for example, the wireless terminal device 101 measures time by using a timer (not shown), and transitions to the reconfiguration state once every day according to the resetting cycle included in the setting information of the sensor module 1. Any cycle can be set as the resetting cycle. For example, the resetting cycle is set when the configuration table of the higher-order management device 161 is updated according to an operation or the like performed to the higher-order management device 161 by an administrator or the like. The resetting cycle may be set when the configuration table of the higher-order management device 161 is updated according to a notification or the like from the wireless terminal device 101. A period including the period in which the wireless terminal device 101 is in the reconfiguration state is one example of the second period. The wireless terminal device 101 in the reconfiguration state performs bidirectional communication.

Here, the lower-order management device 171 and the higher-order management device 161 each output, to a screen or the like, information that allows recognition of timing, time, etc., of the reconfiguration period.

In more detail, for example, the lower-order management device 171 and the higher-order management device 161 each store, for each wireless terminal device 101, a reception time of a re-preparation request (described later) from the wireless terminal device 101, calculates a time to receive a re-preparation request next, by using the stored reception time and the resetting cycle indicated in the configuration table, and outputs the time to a screen or the like. This allows the administrator or the like to recognize the time, timing, etc., at which the wireless sensor system 301 performs bidirectional communication.

The wireless terminal device 101 in the reconfiguration state transmits a re-preparation request.

FIG. 14 shows an example of a data format of a re-preparation request transmitted by a wireless terminal device in the wireless sensor system according to the embodiment of the present disclosure.

With reference to FIG. 14, the re-preparation request is composed of fields corresponding to a PHY header, a MAC header, a message type, and a configuration number, in this order from the beginning.

The communication unit 23 in the wireless terminal device 101 sets a connection destination relay device ID as a destination in the MAC header, sets a provisional sensor ID as a transmission source in the MAC header, and sets an identifier indicating that it is a re-preparation request in the field corresponding to the message type.

The communication unit 23 acquires, from the storage unit 24, the configuration number corresponding to the setting information applied to the corresponding sensor module 1, and includes the configuration number in the re-preparation request. Then, the communication unit 23 transmits a radio signal including the re-preparation request to the connection destination relay device.

Upon receiving the radio signal including the re-preparation request transmitted from the wireless terminal device 101, the sensor-side communication processing unit 41 in the connection destination relay device creates a radio signal including an ACK that acknowledges reception of the radio signal, and transmits the created radio signal to the wireless terminal device 101.

Upon receiving the radio signal including the ACK from the connection destination relay device, the wireless terminal device 101 transitions to the sleep state.

Meanwhile, the connection destination relay device relays the re-preparation request received from the wireless terminal device 101 to the lower-order management device 171, according to the AODV routing protocol, for example.

The reception processing unit 51 in the lower-order management device 171 receives the radio signal including the re-preparation request relayed by the connection destination relay device, and outputs the received re-preparation request to the transmission processing unit 52.

Upon receiving the re-preparation request from the reception processing unit 51, the transmission processing unit 52 changes the destination in the MAC header of the re-preparation request to the ID of the higher-order management device 161, and transmits the re-preparation request to the higher-order management device 161.

The reception processing unit 61 in the higher-order management device 161 receives the re-preparation request transmitted from the lower-order management device 171.

The higher-order management device 161 holds at least a most recent configuration number transmitted to the wireless terminal device 101 and a most recent configuration number received from the wireless terminal device 101.

In more detail, for example, the reception processing unit 61 acquires the provisional sensor ID and a configuration number CN4 included in the received re-preparation request, and stores them in the storage unit 63.

The higher-order management device 161 holds, in the storage unit 63, a configuration table indicating correspondence relationship between the configuration number CN4 received by the reception processing unit 61, the true sensor ID, the provisional sensor ID, the firmware version, and the corresponding setting information S4.

In addition, the higher-order management device 161 holds, in the storage unit 63, a configuration table indicating correspondence relationship between the most recent configuration number CN3 transmitted to the wireless terminal device 101, the true sensor ID, the provisional sensor ID, the firmware version, and setting information S3 to be applied to the corresponding wireless terminal device 101.

When the reception processing unit 61 has stored the provisional sensor ID and the configuration number CN4 in the storage unit 63, the transmission processing unit 62 acquires the provisional sensor ID and the configuration number CN4 from the storage unit 63. Then, with reference to the configuration table stored in the storage unit 63, the transmission processing unit 62 compares the acquired configuration number CN4 with the corresponding configuration number CN3 in the configuration table.

Based on the result of the comparison, the transmission processing unit 62 sets a reconfiguration type that is information regarding presence/absence of a change in the setting information of the sensor module 1.

In more detail, when the configuration number CN4 and the configuration number CN3 in the configuration table are the same, the transmission processing unit 62 sets "1" as the reconfiguration type.

When the configuration number CN4 and the configuration number CN3 in the configuration table are different from each other, the transmission processing unit 62 sets "2" as the reconfiguration type.

The transmission processing unit 62 sets "3" as the reconfiguration type when a configuration table is not present in the higher-order management device 161 because of replacement or the like of the higher-order management device 161, or when the provisional sensor ID acquired by the reception processing unit 61 cannot be recognized because the contents of the configuration table are different.

The transmission processing unit 62 creates a re-response signal including the set reconfiguration type.

In more detail, when the reconfiguration type is "1", the transmission processing unit 62 creates a re-response signal including the reconfiguration type "1" and NULL, i.e., null data, as the setting information of the sensor module 1, and transmits the re-response signal to the lower-order management device 171.

Meanwhile, when the reconfiguration type is "2", the transmission processing unit 62 selectively transmits a content, out of the contents of the setting information S3 to be newly applied to the wireless terminal device 101, which is different from the held setting information S4, to the wireless terminal device 101.

In more detail, the transmission processing unit 62 refers to the configuration table stored in the storage unit 53, and acquires, as difference information, the content of an item, out of items of the setting information S3 of the sensor module 1 corresponding to the configuration number CN3, which has a set value different from the setting information S4 corresponding to the configuration number CN4. In addition, the transmission processing unit 62 acquires the configuration number CN3 from the storage unit 63.

Then, the transmission processing unit 52 creates a re-response signal including the acquired configuration number CN3, the reconfiguration type "2", and the difference information acquired as the setting information of the sensor module 1, and transmits the re-response signal to the lower-order management device 171.

When the reconfiguration type is "3", the transmission processing unit 52 creates a re-response signal including the reconfiguration type "3" and NULL, i.e., null data, as the setting information of the sensor module 1, and transmits the re-response signal to the lower-order management device 171.

The reception processing unit 51 in the lower-order management device 171 receives the re-response signal transmitted from the higher-order management device 161, and outputs the received re-response signal to the transmission processing unit 52.

The transmission processing unit 52 relays the re-response signal received from the reception processing unit 51 to the connection destination relay device, according to the AODV routing protocol, for example.

The transmission processing unit 52 may relay the re-response signal to the connection destination relay device via another relay device 151.

The higher-order-side communication processing unit 42 in the connection destination relay device receives, via the lower-order management device 171, the re-response signal transmitted from the higher-order management device 161, and stores the various information (hereinafter also referred to as "resetting information") included in the received re-response signal, in the storage unit 43.

The wireless terminal device 101 in the reconfiguration state transitions to the sleep state and returns from the sleep state after a predetermined time has passed from the transition, and thereafter transmits a resetting request.

The data format of the resetting request is the same as the data format of the probe request shown in FIG. 5, and is composed of fields corresponding to a PHY header, a MAC header, and a field corresponding to a message type, in this order from the beginning.

The communication unit 23 in the wireless terminal device 101 transmits, to the connection destination relay device, a radio signal including the resetting request in which a connection destination relay device ID is set as a destination in the MAC header, a provisional sensor ID is set as a transmission source in the MAC header, and an identifier indicating that it is a resetting request is set in the field corresponding to the message type.

Upon receiving the radio signal including the resetting request transmitted from the wireless terminal device 101, the connection destination relay device creates a radio signal including an ACK that acknowledges reception of the radio signal, and transmits the created radio signal to the wireless terminal device 101.

Then, the connection destination relay device transmits the setting information of the sensor module 1, i.e., NULL or difference information, included in the corresponding resetting information held therein, to the wireless terminal device 101.

In more detail, upon receiving the radio signal including the resetting request transmitted from the wireless terminal device 101, the sensor-side communication processing unit 41 in the connection destination relay device refers to the provisional sensor ID included in the resetting request, acquires resetting information, out of the resetting information stored in the storage unit 43, which corresponds to the provisional sensor ID, and creates a resetting response.

FIG. 15 shows an example of a data format of a resetting response transmitted by a relay device in the wireless sensor system according to the embodiment of the present disclosure.

With reference to FIG. 15, the resetting response is composed of fields corresponding to a PHY header, a MAC header, a message type, a reconfiguration type, and setting information, in this order from the beginning.

When the reconfiguration type is "1" or "3", the connection destination relay device uses the data format shown in FIG. 15.

FIG. 16 shows another example of a data format of a resetting response transmitted by a relay device in the wireless sensor system according to the embodiment of the present disclosure.

With reference to FIG. 16, the resetting response is composed of fields corresponding to a PHY header, a MAC header, a message type, a configuration number, a reconfiguration type, and setting information, in this order from the beginning.

When the reconfiguration type is "2", the connection destination relay device uses the data format shown in FIG. 16.

The sensor-side communication processing unit 41 sets a provisional sensor ID as a destination in the MAC header, sets a connection destination relay device ID as a transmission source in the MAC header, and sets an identifier indicating that it is a resetting response, in the field corresponding to the message type.

In addition, the sensor-side communication processing unit 41 sets the configuration number, the reconfiguration type, and the setting information of the sensor module 1 which are included in the resetting information acquired from the storage unit 43, in the fields of the resetting response corresponding to the configuration number, the reconfiguration type, and the setting information of the sensor module 1, respectively. Then, the sensor-side communication processing unit 41 transmits a radio signal including the resetting response, to the wireless terminal device 101 having the provisional sensor ID. In addition, the sensor-side communication processing unit 41 outputs the resetting response, to the higher-order-side communication processing unit 42.

The higher-order-side communication processing unit 42 changes the destination in the MAC header of the resetting response received from the sensor-side communication processing unit 41, to the ID of the lower-order management device 171, and transmits a radio signal including the resetting response after the change, to the lower-order management device 171.

The lower-order management device 171 receives the radio signal including the resetting response transmitted from the connection destination relay device, and adds the various information included in the resetting response, to the configuration table held by the lower-order management device 171.

If the connection destination relay device has not yet received, via the lower-order management device 171, the re-response signal transmitted from the higher-order management device 161 at the timing when it has received the radio signal including the resetting request, the connection destination relay device transmits a re-preparation failure notification to the wireless terminal device 101.

The data format of the re-preparation failure notification is the same as the data format of the probe request shown in FIG. 5, and is composed of fields corresponding to a PHY header, a MAC header, and a message type, in this order from the beginning.

The sensor-side communication processing unit 41 in the connection destination relay device transmits a radio signal including the re-preparation failure notification in which a provisional sensor ID is set as a destination in the MAC header, a connection destination relay device ID is set as a transmission source in the MAC header, and an identifier indicating that it is a re-preparation failure notification is set in the field corresponding to the message type, to the wireless terminal device 101 having the provisional sensor ID.

The communication unit 23 in the wireless terminal device 101 receives the radio signal including the resetting response or the re-preparation failure notification transmitted from the connection destination relay device.

When the configuration type included in the resetting response is "1", the communication unit 23 creates a radio signal including an ACK that acknowledges reception of the radio signal, and transmits the created radio signal to the connection destination relay device.

Then, the wireless terminal device 101 transitions to the sleep state.

When the configuration type included in the resetting response is "2", the communication unit 23 stores, in the storage unit 24, the content of the difference information as the setting information of the sensor module 1 included in the resetting response, creates a radio signal including an ACK that acknowledges reception of the radio signal, and transmits the created radio signal to the connection destination relay device.

Then, the wireless terminal device 101 transitions to the sleep state after the sensor module 1 reflects the setting information of the sensor module 1 stored in the storage unit 24.

Meanwhile, when the configuration type included in the resetting response is "3", the communication unit 23 creates a radio signal including an ACK that acknowledges reception of the radio signal, and transmits the created radio signal to the connection destination relay device.

Then, the wireless terminal device 101 transitions from the reconfiguration state to the setup state, and transmits a preparation request.

The wireless terminal device 101 returns from the sleep state after a predetermined time has passed from the transition to the sleep state, and then transitions from the reconfiguration state to the measurement state.

Meanwhile, with reference to FIG. 3, upon receiving the radio signal including the re-preparation failure notification transmitted from the connection destination relay device, the wireless terminal device 101 transitions from the reconfiguration state to a re-scanning state. When the wireless terminal device 101 has received the radio signal including the re-preparation failure notification transmitted from the connection destination relay device, the wireless terminal device 101 may perform, a plurality of times, an operation of transition to the sleep state, returning from the sleep state after a predetermined time has passed from the transition to the sleep state, and transmitting a resetting request. A period including the period in which the wireless terminal device 101 is in the re-scanning state is one example of the second period. The wireless terminal device 101 in the re-scanning state performs bidirectional communication.

The wireless terminal device 101 in the re-scanning state performs the connection process shown in FIG. 4, and transitions from the re-scanning state to the setup state after the connection process. If the wireless terminal device 101 in the re-scanning state has not received a probe response before a lapse of a predetermined period from transmission of a probe request in the connection process, the wireless terminal device 101 transitions from the re-scanning state to the measurement state.

The lower-order management device 171 may transmit the processed sensor measurement value to the higher-order management device 161 instead of the cloud server 181. In this case, the lower-order management device 171 need not hold the configuration table. The higher-order-side communication processing unit 42 in the relay device 151 need not transmit a radio signal including a setting response, to the lower-order management device 171.

Figure 17:
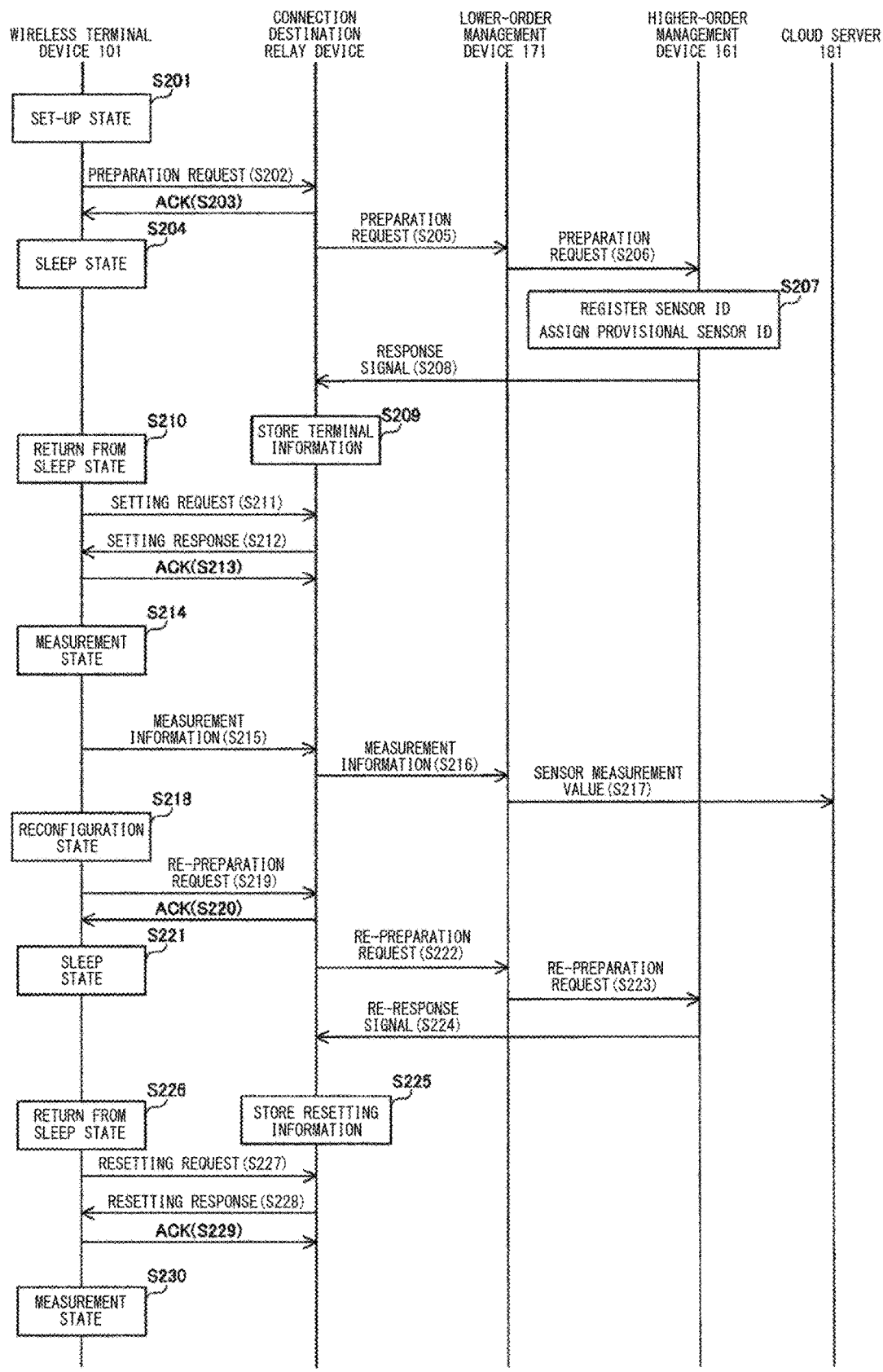
FIG. 17 shows a sequence of a process of updating setting of a sensor module in the wireless sensor system according to the embodiment of the present disclosure.

FIG. 17 shows a sequence of a process of updating setting of a sensor module 1 in the wireless sensor system according to the embodiment of the present disclosure.

With reference to FIG. 17, firstly, a wireless terminal device 101 transitions to a setup state (step S201), and transmits a preparation request to a connection destination relay device (step S202).

Next, the connection destination relay device receives the preparation request transmitted from the wireless terminal device 101, and transmits an ACK for the received preparation request, to the wireless terminal device 101 (step S203).

Next, the wireless terminal device 101 receives the ACK, for the preparation request, transmitted from the connection destination relay device, and transitions to a sleep state (step S204).

Meanwhile, the connection destination relay device relays the preparation request transmitted from the wireless terminal device 101. That is, the connection destination relay device receives the preparation request, and relays the received preparation request to the lower-order management device 171 (step S205).

Next, the lower-order management device 171 relays the preparation request, which has been relayed by the connection destination relay device, to the higher-order management device 161 (step S206).

Next, the higher-order management device 161 registers a sensor ID included in the preparation request having been relayed by the lower-order management device 171, as identification information unique to the corresponding wireless terminal device 101, and assigns a provisional sensor ID having a shorter data length than the sensor ID, as terminal identification information, to the wireless terminal device 101 (step S207).

Next, the higher-order management device 161 transmits a response signal including a sensor ID, a provisional sensor ID, a configuration number, and setting information of a sensor module 1, to the connection destination relay device via the lower-order management device 171 (step S208).

Next, the connection destination relay device receives, via the lower-order management device 171, the response signal transmitted from the higher-order management device 161, and stores therein terminal information included in the received response signal (step S209).

The wireless terminal device 101 returns from the sleep state after a predetermined time has passed from the transition to the sleep state (step S210).

Next, the wireless terminal device 101 transmits a setting request to the connection destination relay device (step S211).

Next, the connection destination relay device receives the setting request, and transmits a setting response including various setting contents included in the stored terminal information, to the wireless terminal device 101 (step S212).

Next, the wireless terminal device 101 receives the setting response transmitted from the connection destination relay device, transmits an ACK for the received setting response, to the connection destination relay device (step S213), reflects, in itself, the setting information included in the setting response, and then transitions to a measurement state (step S214).

Next, the wireless terminal device 101 periodically transmits measurement information including a configuration number and having a broadcast address being set as described above (step S215).

The connection destination relay device receives the measurement information transmitted from the wireless terminal device 101, and transmits the received measurement information to the lower-order management device 171 (step S216).

Next, the lower-order management device 171 receives the measurement information transmitted from the connection destination relay device, processes a sensor measurement value included in the received measurement information, and transmits the processed sensor measurement value to the cloud server 181 (step S217).

Next, the wireless terminal device 101 transitions from the measurement state to a reconfiguration state, according to a resetting cycle included in the setting contents (step S218).

Next, the wireless terminal device 101 transmits a re-preparation request to the connection destination relay device (step S219).

Next, the connection destination relay device receives the re-preparation request transmitted from the wireless terminal device 101, and transmits an ACK for the received re-preparation request, to the wireless terminal device 101 (step S220).

Next, the wireless terminal device 101 receives the ACK, for the re-preparation request, transmitted from the connection destination relay device, and transitions to a sleep state (step S221).

Meanwhile, the connection destination relay device relays the re-preparation request transmitted from the wireless terminal device 101. That is, the connection destination relay device receives the re-preparation request, and relays the received re-preparation request to the lower-order management device 171 (step S222).

Next, the lower-order management device 171 relays the re-preparation request, which has been relayed by the connection destination relay device, to the higher-order management device 161 (step S223).

Next, the higher-order management device 161 transmits a re-response signal including a configuration number and a reconfiguration type, to the connection destination relay device via the lower-order management device 171 (step S224).

Next, the connection destination relay device receives, via the lower-order management device 171, the re-response signal transmitted from the higher-order management device 161, and stores therein resetting information included in the received re-response signal (step S225).

Next, the wireless terminal device 101 returns from the sleep state after a predetermined time has passed from the transition to the sleep state (step S226).

Next, the wireless terminal device 101 transmits a resetting request to the connection destination relay device (step S227).

Next, the connection destination relay device transmits, to the wireless terminal device 101, a resetting response including various setting contents included in the stored resetting information (step S228).

Next, the wireless terminal device 101 receives the resetting response transmitted from the connection destination relay device, transmits an ACK for the received resetting response, to the connection destination relay device (step S229), reflects, in itself, setting information included in the resetting response, and then transitions to a measurement state (step S230).

Figure 18:
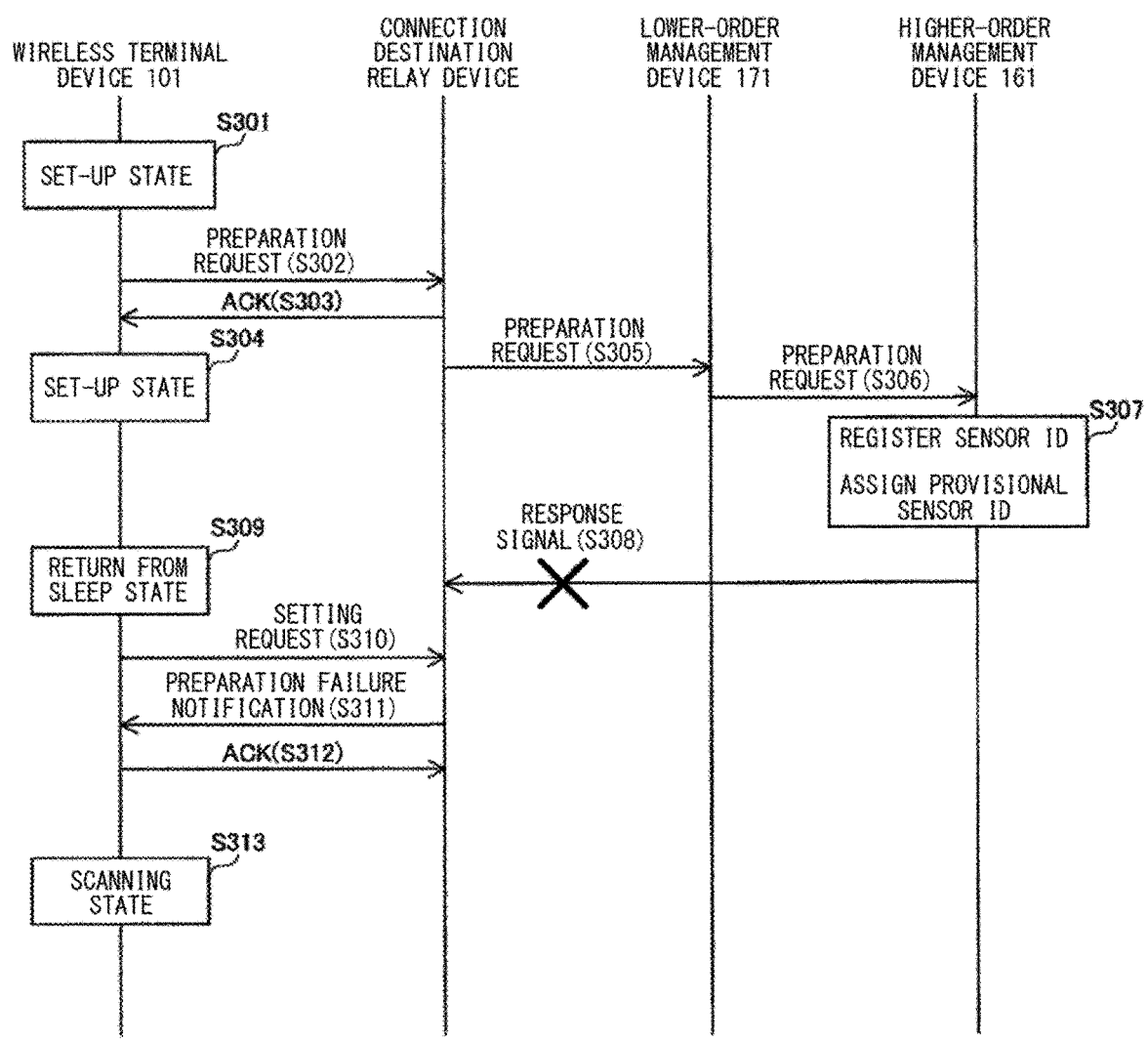
FIG. 18 shows a sequence in a case where the relay device cannot receive setting information in a process of changing setting of the sensor module in the wireless sensor system according to the embodiment of the present disclosure.

FIG. 18 shows a sequence in a case where a relay device cannot receive setting information, in a process of changing setting of a sensor module in the wireless sensor system according to the embodiment of the present disclosure.

With reference to FIG. 18, operations in steps S301 to S307 are identical to the operations in steps S201 to S207 shown in FIG. 17.

The connection destination relay device cannot receive the response signal due to any factor such as data transmission delay between a plurality of relay devices 151 (step S308).

Next, the wireless terminal device 101 returns from the sleep state after a predetermined time has passed from the transition to the sleep state (step S309).

Next, the wireless terminal device 101 transmits a setting request to the connection destination relay device (step S310).

Next, the connection destination relay device transmits a preparation failure notification to the wireless terminal device 101 because the connection destination relay device has not yet received a response signal at the timing when it has received the setting request (step S311).

Next, the wireless terminal device 101 receives the preparation failure notification transmitted from the connection destination relay device, transmits an ACK for the received preparation failure notification to the connection destination relay device (step S312), and transitions to a scanning state (step S313).

Figure 19:
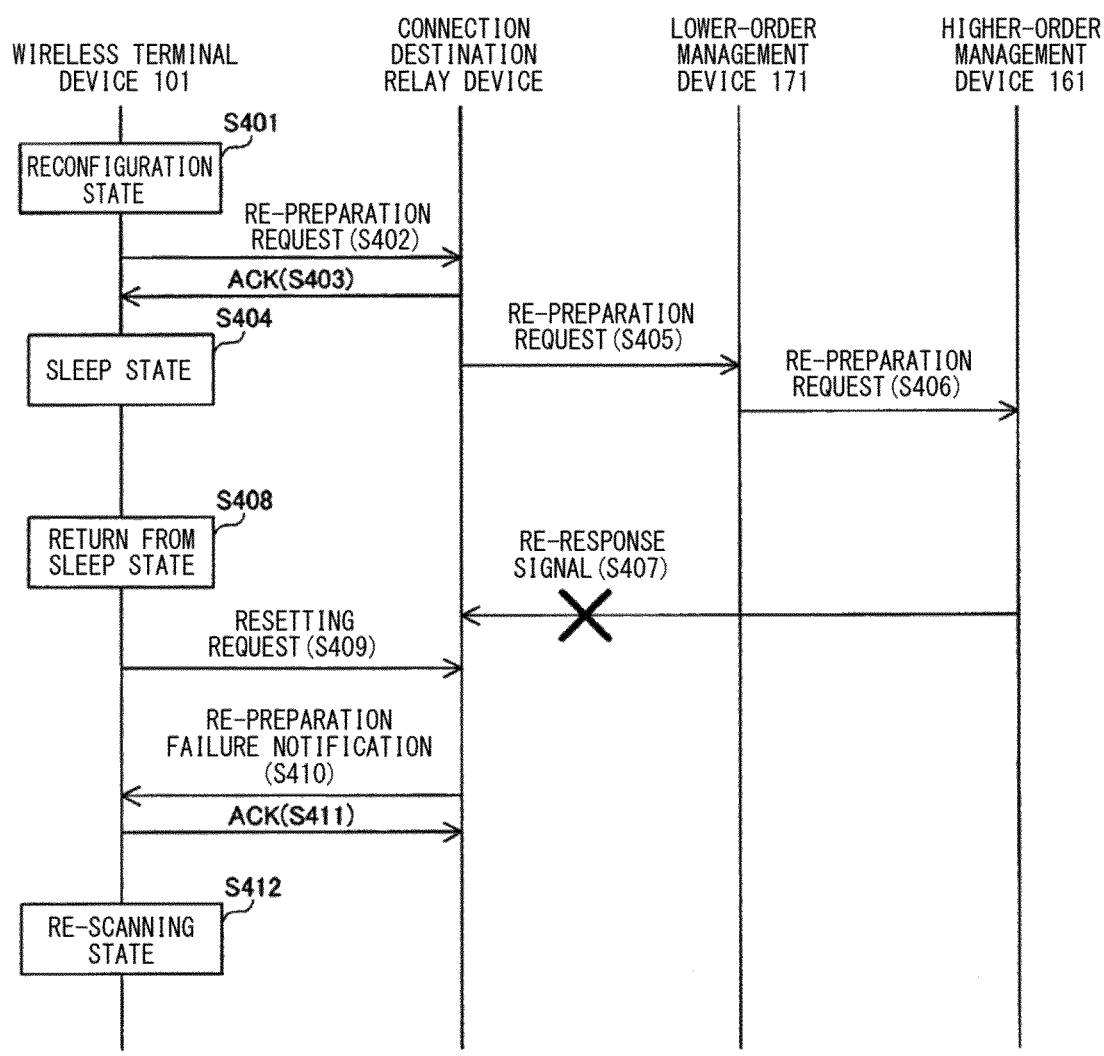
FIG. 19 shows a sequence in a case where the relay device cannot receive a resetting response in a reconfiguration state, in the wireless sensor system according to the embodiment of the present disclosure.

FIG. 19 shows a sequence in a case where a relay device in a reconfiguration state cannot receive a resetting response, in the wireless sensor system according to the embodiment of the present disclosure.

With reference to FIG. 19, operations in steps S401 to S406 are identical to the operations in steps S218 to S223 shown in FIG. 17.

The connection destination relay device cannot receive the re-response signal due to any factor such as data transmission delay between a plurality of relay devices 151 (step S407).

Next, the wireless terminal device 101 returns from the sleep state after a predetermined time has passed from the transition to the sleep state (step S408).

Next, the wireless terminal device 101 transmits a resetting request to the connection destination relay device (step S409).

Next, the connection destination relay device transmits a re-preparation failure notification to the wireless terminal device 101 because the connection destination relay device has not yet received a re-response signal at the timing when it has received the resetting request (step S410).

Next, the wireless terminal device 101 receives the re-preparation failure notification transmitted from the connection destination relay device, transmits an ACK for the received re-preparation failure notification to the connection destination relay device (step S411), and transitions to a re-scanning state (step S412).

In the wireless sensor system according to the embodiment of the present disclosure, the relay device 151 receives and holds setting information, and the wireless terminal device 101 transitions to the sleep state after transmitting a preparation request. However, the present disclosure is not limited thereto. The wireless terminal device 101 may not necessarily transit to the sleep state after transmitting the preparation request, and the relay device 151 may transmit the setting information to the wireless terminal device 101 immediately after receiving the setting information from the lower-order management device 171.

In the wireless sensor system according to the embodiment of the present disclosure, the higher-order management device 161 assigns, to the wireless terminal device 101, a provisional sensor ID having a shorter data length than the sensor ID, of the wireless terminal device 101, which is registered in the higher-order management device 161. However, the present disclosure is not limited thereto. The higher-order management device 161 may not necessarily assign the provisional sensor ID to the wireless terminal device 101, and the sensor ID may be used in the wireless terminal device 101, the relay device 151, and the lower-order management device 171.

In the wireless sensor system according to the embodiment of the present disclosure, the second period includes the initial period and the period that is periodically or non-periodically started after the initial period. However, the present disclosure is not limited thereto. The second period may be either the initial period or the period that is periodically or non-periodically started after the initial period.

In the wireless sensor system according to the embodiment of the present disclosure, different channels are used for the one-way communication and the bidirectional communication. However, the present disclosure is not limited thereto. The wireless sensor system 301 may use the same channel for the one-way communication and the bidirectional communication.

In the wireless sensor system according to the embodiment of the present disclosure, the lower-order management device 171 and the higher-order management device 161 each output information that allows recognition of timing, time, etc., of the second period. However, the present disclosure is not limited thereto. The lower-order management device 171 and the higher-order management device 161 may not necessarily output such information.

In the wireless sensor system according to the embodiment of the present disclosure, the higher-order management device 161 transmits setting information related to the wireless terminal device 101. However, the present disclosure is not limited thereto. The higher-order management device 161 may not necessarily transmit the setting information related to the wireless terminal device 101. In this case, the wireless terminal device 101 transmits measurement information according to the setting information S1 that is set therein.

In the wireless sensor system according to the embodiment of the present disclosure, the higher-order management device 161 transmits a configuration number that allows identification of a format of measurement information. However, the present disclosure is not limited thereto. The higher-order management device 161 may not necessarily transmit the configuration number.

In the wireless sensor system according to the embodiment of the present disclosure, the wireless terminal device 101 includes a configuration number in the measurement information, and transmits the measurement information. However, the present disclosure is not limited thereto. The wireless terminal device 101 may separately transmit the configuration number and the measurement information.

In the wireless sensor system according to the embodiment of the present disclosure, the lower-order management device 171 processes the measurement information transmitted from the wireless terminal device 101, by using a format corresponding to the configuration number included in the measurement information. However, the present disclosure is not limited thereto. The lower-order management device 171 may process the measurement information by using a format corresponding to the most recent configuration number transmitted to the wireless terminal device 101.

In the wireless sensor system according to the embodiment of the present disclosure, the higher-order management device 161 holds at least the most recent configuration number transmitted to the wireless terminal device 101 and the most recent configuration number received from the wireless terminal device 101. However, the present disclosure is not limited thereto. The higher-order management device 161 may not necessarily hold the most recent configuration number transmitted to the wireless terminal device 101 and the most recent configuration number received from the wireless terminal device 101. In this case, for example, if the setting information has been changed by an administrator, the higher-order management device 161 transmits the changed setting information to the corresponding wireless terminal device 101.

In the wireless sensor system according to the embodiment of the present disclosure, the higher-order management device 161, in the second period, selectively transmits a content, out of the contents of setting information to be newly applied to the wireless terminal device 101, which is different from the received setting information, to the wireless terminal device 101. However, the present disclosure is not limited thereto. The higher-order management device 161 may transmit the contents of the setting information to be newly applied to the wireless terminal device 101, to the wireless terminal device 101.

In the wireless sensor system according to the embodiment of the present disclosure, the wireless terminal device 101 transmits, in the initial period, setting information that has already been registered. However, the present disclosure is not limited thereto. The wireless terminal device 101 may not necessarily transmit the setting information in the initial period.

In the wireless sensor system according to the embodiment of the present disclosure, the higher-order management device 161 transmits a configuration number regardless of whether or not there is a content, out of the contents of the setting information to be newly applied to the sensor module 1, which is different from the setting information received from the wireless terminal device 101. However, the present disclosure is not limited thereto. The higher-order management device 161 may transmit a configuration number when there is a content, out of the contents of the setting information to be newly applied to the sensor module 1, which is different from the setting information received from the wireless terminal device 101.

In the wireless sensor system according to the embodiment of the present disclosure, the higher-order management device 161 transmits a provisional sensor ID regardless of whether or not there is a content, out of the contents of the setting information to be newly applied to the sensor module 1, which is different from the setting information received from the wireless terminal device 101. However, the present disclosure is not limited thereto. The higher-order management device 161 may transmit a provisional sensor ID when there is a content, out of the contents of the setting information to be newly applied to the sensor module 1, which is different from the setting information received from the wireless terminal device 101.

In the wireless sensor system according to the embodiment of the present disclosure, the higher-order management device 161 and the cloud server 181 are separate devices. However, the present disclosure is not limited thereto. The wireless sensor system 301 may include a single device serving as both the higher-order management device 161 and the cloud server 181.

In the wireless sensor system according to the embodiment of the present disclosure, the higher-order management device 161 and the lower-order management device 171 are separate devices. However, the present disclosure is not limited thereto. The wireless sensor system 301 may include a single device serving as both the higher-order management device 161 and the lower-order management device 171.

In the wireless sensor system according to the embodiment of the present disclosure, the relay device 151 and the lower-order management device 171 are separate devices. However, the present disclosure is not limited thereto. The wireless sensor system 301 may include a single device serving as both the relay device 151 and the lower-order management device 171.

In the wireless sensor system according to the embodiment of the present disclosure, when the relay device 151 has received a setting request transmitted from the wireless terminal device 101, then, if the relay device 151 has not yet received setting information from the management device, the relay device 151 transmits predetermined information to the wireless terminal device 101. However, the present disclosure is not limited thereto. The relay device 151 may not necessarily transmit the predetermined information to the wireless terminal device 101 even if the relay device 151 has not received the setting information from the management device.

In the wireless sensor system according to the embodiment of the present disclosure, the relay device 151 includes its own identification information in a preparation request and transmits the preparation request to the management device. However, the present disclosure is not limited thereto. The relay device 151 may separately transmit the identification information and the preparation request.

In the wireless sensor system according to the embodiment of the present disclosure, the wireless terminal device 101 transmits measurement information by one-way communication in the first period, and transmits other information by bidirectional communication in the second period. However, the present disclosure is not limited thereto. The wireless terminal device 101 may transmit the measurement information and the other information by one-way communication in the first period, and may transmit the measurement information and the other information by bidirectional communication in the second period.

In the wireless sensor system according to the embodiment of the present disclosure, the higher-order management device 161 assigns, to the wireless terminal device 101, a provisional sensor ID having a shorter data length than the sensor ID, of the wireless terminal device 101, which is registered in the higher-order management device 161. However, the present disclosure is not limited thereto. The higher-order management device 161 may not necessarily assign the provisional sensor ID to the wireless terminal device 101, and the sensor ID may be used in the wireless terminal device 101, the relay device 151, and the lower-order management device 171.

In the wireless sensor system according to the embodiment of the present disclosure, the higher-order management device 161 assigns a configuration number to the wireless terminal device 101. However, the present disclosure is not limited thereto. The higher-order management device 161 may not necessarily assign a configuration number to the wireless terminal device 101.

In the wireless sensor system according to the embodiment of the present disclosure, the lower-order management device 171 transmits, to another device, measurement information obtained by changing a provisional sensor ID, which is included in measurement information transmitted from the wireless terminal device 101, to the corresponding sensor ID. However, the present disclosure is not limited thereto. The lower-order management device 171 may transmit the measurement information including the provisional sensor ID to another device.

Incidentally, a technology capable of constructing an excellent system for transmitting a result of measurement by a sensor from a wireless terminal device to a management device, has been desired.

In the wireless sensor system according to the embodiment of the present disclosure, the wireless terminal device 101 is driven by electric power stored in the power storage unit 25, and transmits measurement information indicating a result of measurement by the sensor 21. The lower-order management device 171 receives the measurement information transmitted from the wireless terminal device. The wireless terminal device 101 performs one-way communication in a first period, transmits the measurement information in the first period, performs bidirectional communication in a second period different from the first period, and transmits other information in the second period.

With this configuration, switching between the one-way communication and the bidirectional communication can be achieved according to information to be transmitted. In addition, since information other than the result of measurement by the sensor 21 is transmitted/received through the bidirectional communication, it is possible to transmit setting information of the sensor 21, firmware update information, etc., from the higher-order management device 161 to the wireless terminal device 101. This makes it unnecessary to go to a site where the wireless terminal device 101 is installed and change settings or the like. In addition, since a switch, etc., for setting of the wireless terminal device 101 can be dispensed with, the cost of the wireless terminal device 101 can be reduced.

Therefore, in the wireless sensor system according to the embodiment of the present disclosure, an excellent system for transmitting the result of measurement by the sensor 21 from the wireless terminal device 101 to the higher-order management device 161, can be constructed.

In the wireless sensor system according to the embodiment of the present disclosure, the second period includes a period that is periodically or non-periodically started after an initial period that exists from when the wireless terminal device 101 starts up to when the first period is started.

With this configuration, since the period for performing the bidirectional communication is limited to the second period, the transmission amount of data can be reduced. When the wireless terminal device 101 and the higher-order management device 161 perform asynchronous communication, it is difficult for the wireless terminal device 101 to recognize the timing to transmit data. Therefore, the wireless terminal device 101 needs to wait for data during the period for performing the bidirectional communication, which results in an increase in power consumption. However, since the period for performing the bidirectional communication is limited to the second period, power consumption of the wireless terminal device 101 can be reduced.

In the wireless sensor system according to the embodiment of the present disclosure, the second period includes at least one of the initial period that exists from when the wireless terminal device 101 starts up to when the first period is started, and the period that is periodically or non-periodically started after the initial period.

With this configuration, the period for performing the bidirectional communication is limited to the second period, whereby the transmission amount of data can be reduced. When the wireless terminal device 101 and the higher-order management device 161 perform asynchronous communication, it is difficult for the wireless terminal device 101 to recognize the timing to transmit data. Therefore, the wireless terminal device 101 needs to wait for data during the period for performing the bidirectional communication, which results in an increase in power consumption. However, since the period for performing the bidirectional communication is limited to the second period, power consumption of the wireless terminal device 101 can be reduced. In addition, since the bidirectional communication is performed during the initial period, setting required for the operation of the wireless terminal device 101 can be reflected.

In the wireless sensor system according to the embodiment of the present disclosure, the wireless terminal device 101 uses different channels for the one-way communication and the bidirectional communication.

With this configuration, in the one-way communication in which a data retransmission process is not performed, interference of radio signals between the wireless terminal devices 101 can be inhibited, whereby the risk of missing data due to such interference can be reduced.

In the wireless sensor system according to the embodiment of the present disclosure, the higher-order management device 161 outputs information that allows recognition of the second period.

With this configuration, an administrator or the like can recognize the time, the timing, etc., at which the wireless sensor system 301 performs the bidirectional communication. Therefore, this configuration is useful for maintenance, etc.

In the wireless sensor system according to the embodiment of the present disclosure, the higher-order management device 161 transmits, to the wireless terminal device 101, setting information related to the wireless terminal device 101. The wireless terminal device 101 receives, in the second period, the setting information transmitted from the higher-order management device 161, and transmits the measurement information according to the received setting information.

With this configuration, setting of the wireless terminal device 101 can be performed through communication, and therefore, setting change or the like can be remotely performed in a short time during a desired period.

In the wireless sensor system according to the embodiment of the present disclosure, the higher-order management device 161 further transmits, to the wireless terminal device 101, identification information that allows identification of a format of the measurement information. The wireless terminal device 101 receives, in the second period, the identification information transmitted from the higher-order management device 161, and transmits the received identification information.

As described above, since the wireless terminal device 101 transmits information indicating the setting content thereof, the higher-order management device 161 can easily determine whether or not the setting content of the wireless terminal device 101 is appropriate.

In the wireless sensor system according to the embodiment of the present disclosure, the wireless terminal device 101 includes the identification information in the measurement information, and transmits the measurement information.

With this configuration, even when the higher-order management device 161 cannot confirm, during the second period, whether or not change in the setting content has been reflected in the wireless terminal device 101, the higher-order management device 161 can confirm, during the first period, whether or not change in the setting content has been reflected. Therefore, the higher-order management device 161 can confirm the setting content of the wireless terminal device 101 more reliably.

In the wireless sensor system according to the embodiment of the present disclosure, the lower-order management device 171 receives the measurement information transmitted from the wireless terminal device 101, and processes the received measurement information by using the format corresponding to the identification information included in the received measurement information.

With this configuration, the process for the measurement information can be simplified.

In the wireless sensor system according to the embodiment of the present disclosure, the higher-order management device 161 holds, at least, most recent identification information transmitted to the wireless terminal device 101 and most recent identification information received from the wireless terminal device 101.

With this configuration, even when the measurement information according to the setting content before reflection of change in the setting content is transmitted from the wireless terminal device 101, the higher-order management device 161 can accurately process the measurement information. In addition, an administrator or the like can confirm the setting content to be set by the wireless terminal device 101.

In the wireless sensor system according to the embodiment of the present disclosure, the wireless terminal device 101 transmits the identification information in the second period that is periodically or non-periodically started. The higher-order management device 161 receives the identification information transmitted from the wireless terminal device, holds the setting information corresponding to the received identification information, and selectively transmits a content, out of contents of the setting information to be newly applied to the wireless terminal device 101, which is different from the held setting information, to the wireless terminal device 101.

With this configuration, the setting content of the wireless terminal device 101 can be confirmed at predetermined intervals, and a necessary setting content can be reflected in the wireless terminal device 101. In addition, since only an updated part is transmitted to the wireless terminal device 101, the transmission amount of data from the higher-order management device 161 can be reduced.

In the wireless sensor system according to the embodiment of the present disclosure, the wireless terminal device 101 transmits the setting information registered in advance, during the second period that exists from when the wireless terminal device 101 starts up to when the first period is started.

With this configuration, the higher-order management device 161 can grasp the initial setting of the wireless terminal device 101, and therefore can confirm, before transmission of the measurement information from the wireless terminal device 101, whether or not the setting content of the wireless terminal device 101 is appropriate. In addition, the higher-order management device 161 can grasp the setting of the wireless terminal device 101 even if the wireless terminal device 101 does not include the setting information in the measurement information each time the measurement information is transmitted. Therefore, the amount of data transmitted from the wireless terminal device 101 can be reduced.

In the wireless sensor system according to the embodiment of the present disclosure, the higher-order management device 161 receives the setting information transmitted from the wireless terminal device 101, and selectively transmits a content, out of the contents of the setting information to be newly applied to the wireless terminal device 101, which is different from the received setting information, to the wireless terminal device 101.

With this configuration, when the initial setting need not be changed, the transmission amount of data from the higher-order management device 161 can be reduced.

In the wireless sensor system according to the embodiment of the present disclosure, the higher-order management device 161 receives the setting information transmitted from the wireless terminal device 101, and transmits the identification information to the wireless terminal device 101 regardless of whether or not there is a content, out of the contents of the setting information to be newly applied to the wireless terminal device 101, which is different from the received setting information.

With this configuration, the wireless terminal device 101 can more reliably recognize the content to be set therein. In addition, the higher-order management device 161 can more reliably process the measurement information from the wireless terminal device 101.

In the wireless sensor system according to the embodiment of the present disclosure, the higher-order management device 161 receives the setting information transmitted from the wireless terminal device 101, and transmits, to the wireless terminal device 101, terminal identification information having a shorter data length than unique identification information, of the wireless terminal device 101, registered in the higher-order management device 161, regardless of whether or not there is a content, out of the contents of the setting information to be newly applied to the wireless terminal device 101, which is different from the received setting information.

With this configuration, the transmission amount of data in the wireless sensor system 301 can be reduced. In addition, since the higher-order management device 161 unitarily manages the terminal identification information, overlapping of the terminal identification information can be avoided in contrast to the case where, for example, terminal identification information is determined and assigned to each of networks under control of the same higher-order management device 161. Therefore, even when the wireless terminal device 101 moves to another network under control of the higher-order management device 161, the wireless terminal device 101 can continue to use the same terminal identification information. This prevents a dead number from occurring in the terminal identification information due to setting of an assignment range of terminal identification information for each network, and therefore, efficiency of use of resources such as a memory can be improved.

In the wireless terminal device according to the embodiment of the present disclosure, the data creation unit 22 creates measurement information indicating a result of measurement by the sensor 21. The communication unit 23 transmits a radio signal including the measurement information created by the data creation unit 22 or other information. The communication unit 23 performs one-way communication in a first period, transmits the measurement information in the first period, performs bidirectional communication in a second period different form the first period, and transmits other information in the second period.

With this configuration, switching between the one-way communication and the bidirectional communication can be achieved according to information to be transmitted. In addition, since information other than the result of measurement by the sensor 21 is transmitted/received through the bidirectional communication, it is possible to transmit setting information of the sensor 21, firmware update information, etc., from the higher-order management device 161 to the wireless terminal device 101. This makes it unnecessary to visit a site where the wireless terminal device 101 is installed, and change settings or the like. In addition, since a switch, etc., for setting of the wireless terminal device 101 can be dispensed with, the cost of the wireless terminal device 101 can be reduced.

Therefore, in the wireless terminal device according to the embodiment of the present disclosure, an excellent system for transmitting the result of measurement by the sensor 21 from the wireless terminal device 101 to the higher-order management device 161, can be constructed.

In the communication control method according to the embodiment of the present disclosure, firstly, the wireless terminal device 101 performs one-way communication in a first period, and transmits measurement information indicating a result of measurement by the sensor 21 in the first period. Next, the wireless terminal device 101 performs bidirectional communication in a second period different from the first period, and transmits other information in the second period.

With this configuration, switching between the one-way communication and the bidirectional communication can be achieved according to information to be transmitted. In addition, since information other than the result of measurement by the sensor 21 is transmitted/received through the bidirectional communication, it is possible to transmit setting information of the sensor 21, firmware update information, etc., from the higher-order management device 161 to the wireless terminal device 101. This makes it unnecessary to visit a site where the wireless terminal device 101 is installed and change settings or the like. In addition, since a switch, etc., for setting of the wireless terminal device 101 can be dispensed with, the cost of the wireless terminal device 101 can be reduced.

Therefore, in the communication control method according to the embodiment of the present disclosure, an excellent system for transmitting the result of measurement by the sensor 21 from the wireless terminal device 101 to the higher-order management device 161, can be constructed.

In the wireless sensor system according to the embodiment of the present disclosure, the wireless terminal device 101 is driven by electric power stored in the power storage unit, and transmits measurement information indicating a result of measurement by a sensor. The relay device 151 relays information received from the wireless terminal device 101. The lower-order management device 171 receives the measurement information relayed by the relay device 151. The wireless terminal device 101 transmits a preparation request. The relay device 151 receives the preparation request transmitted from the wireless terminal device 101, and relays the preparation request to the higher-order management device 161. The higher-order management device 161 receives the preparation request relayed by the relay device 151, and transmits setting information related to the wireless terminal device 101 to the relay device 151. The relay device 151 receives and holds the setting information transmitted from the higher-order management device 161. After transmission of the preparation request, the wireless terminal device 101 transitions to a sleep state to stop the communication operation, and transmits a setting request after returning from the sleep state. The relay device 151 receives the setting request transmitted from the wireless terminal device 101, and transmits the setting information held therein to the wireless terminal device 101.

With this configuration, the higher-order management device 161 can transmit the setting information in response to the preparation request transmitted from the wireless terminal device 101, and therefore can transmit the setting information at a timing when the wireless terminal device 101 requires the setting information, for example. In addition, the wireless terminal device 101 transitions to the sleep state after the communication operation, and the relay device 151 holds the setting content to be applied to the wireless terminal device 101. Therefore, the setting content to be applied can be more reliably reflected in the wireless terminal device 101 while reducing power consumption of the wireless terminal device 101.

Therefore, in the wireless sensor system according to the embodiment of the present disclosure, an excellent system for transmitting the result of measurement by the sensor 21 from the wireless terminal device 101 to the lower-order management device 171 can be constructed.

In the wireless sensor system according to the embodiment of the present disclosure, the relay device 151 receives the setting request transmitted from the wireless terminal device 101, then, if the relay device 151 has not yet received the setting information from the management device, the relay device 151 transmits predetermined information to the wireless terminal device 101.

With this configuration, w % ben the setting information from the higher-order management device 161 has not arrived at the relay device 151, the wireless terminal device 101 receives the predetermined information and transitions to, for example, the sleep state, whereby an increase in power consumption due to waiting can be inhibited.

In the wireless sensor system according to the embodiment of the present disclosure, the wireless terminal device 101 receives the predetermined information transmitted from the relay device 151, transitions to the sleep state, and transmits the setting request to the relay device 151 after returning from the sleep state.

With this configuration, the setting information from the higher-order management device 161 can be received more reliably while inhibiting increase in power consumption due to waiting in the wireless terminal device 101.

In the wireless sensor system according to the embodiment of the present disclosure, the relay device 151 includes its own identification information in the preparation request, and transmits the preparation request to the management device.

With this configuration, since the higher-order management device 161 can recognize the relay device 151 that relays the preparation request from the wireless terminal device 101, the setting information can be more reliably transmitted to the wireless terminal device 101. In addition, since the higher-order management device 161 can transmit the setting information while selecting the relay device 151, the transmission amount of data can be reduced as compared to the case where data are transmitted in parallel to a plurality of relay devices 151. Thus, smooth transmission of data can be achieved even in a transmission path having a small transmission capacity.

In the wireless sensor system according to the embodiment of the present disclosure, one-way communication is performed in the first period, the measurement information is transmitted in the first period, bidirectional communication is performed in the second period different from the first period, and other information is transmitted in the second period.

With this configuration, switching between the one-way communication and the bidirectional communication can be achieved according to information to be transmitted, for example. In addition, since information other than the result of measurement by the sensor is transmitted/received through the bidirectional communication, it is possible to transmit setting information of the sensor, firmware update information, etc., from the higher-order management device 161 to the wireless terminal device 101. This makes it unnecessary to go to a site where the wireless terminal device 101 is installed and change settings or the like. In addition, since a switch, etc., for setting of the wireless terminal device 101 can be dispensed with, the cost of the wireless terminal device 101 can be reduced.

In the wireless sensor system according to the embodiment of the present disclosure, the wireless terminal device 101 performs a connection process of establishing communication connection with the relay device 151. In the connection process, the wireless terminal device 101 can select a plurality of data rates, and determines whether or not to be communicable with the relay device 151 for each of the data rates in a descending order.

The configuration of selecting the higher data rate results in a reduction in time required for data transmission, whereby power consumption can be reduced, for example.

In the wireless sensor system according to the embodiment of the present disclosure, the wireless terminal device 101, in the connection process, can select a plurality of channels, and determines whether or not to be communicable with the relay device 151 while switching the channels with the data rates being fixed.

The configuration of selecting a communicable channel while maintaining the data rate realizes data transmission at a higher data rate.

In the communication control method according to the embodiment of the present disclosure, firstly, the wireless terminal device 101 transmits a preparation request. Next, the relay device 151 receives the preparation request transmitted from the wireless terminal device 101, and relays the preparation request to the higher-order management device 161. Next, the higher-order management device 161 receives the preparation request relayed by the relay device 151, and transmits setting information related to the wireless terminal device 101 to the relay device 151. Next, the relay device 151 receives and holds the setting information transmitted from the higher-order management device 161. The wireless terminal device 101 transitions to a sleep state to stop the communication operation, after transmission of the preparation request. The wireless terminal device 101 transmits a setting request after returning from the sleep state. Then, the relay device 151 receives the setting request transmitted from the wireless terminal device 101, and transmits the setting information held therein to the wireless terminal device 101.

With this configuration, the higher-order management device 161 can transmit the setting information in response to the preparation request transmitted from the wireless terminal device 101, and therefore can transmit the setting information at a timing when the wireless terminal device 101 requires the setting information, for example. In addition, the wireless terminal device 101 transitions to the sleep state after the communication operation, and the relay device 151 holds the setting content to be applied to the wireless terminal device 101. Therefore, the setting content to be applied can be more reliably reflected in the wireless terminal device 101 while reducing power consumption of the wireless terminal device 101.

Therefore, in the communication control method according to the embodiment of the present disclosure, an excellent system for transmitting the result of measurement by the sensor 21 from the wireless terminal device 101 to the lower-order management device 171, can be constructed.

In the wireless sensor system according to the embodiment of the present disclosure, one or a plurality of wireless terminal devices 101 are each driven by electric power stored in a power storage unit, and each transmits measurement information indicating a result of measurement by the sensor 21. A plurality of lower-order management devices 171 receive the measurement information transmitted from the wireless terminal devices 101. A higher-order management device 161 is in communication with each lower-order management device 171. The higher-order management device 161 assigns, to each wireless terminal device 101, terminal identification information having a shorter data length than unique identification information, of the wireless terminal device 101, which is registered therein. The wireless terminal device 101 includes, in the measurement information, the terminal identification information assigned by the higher-order management device 161, and transmits the measurement information.

With this configuration, the transmission amount of data can be reduced. In addition, since the higher-order management device 161 unitarily manages the terminal identification information, overlapping of the terminal identification information can be avoided in contrast to the case where, for example, terminal identification information is determined and assigned to each of networks under control of the lower-order management device 171. Therefore, even when a wireless terminal device moves to a network under control of another lower-order management device 171 under control of the same higher-order management device 161, the wireless terminal device 101 can continue to use the same terminal identification information. This prevents a dead number from occurring in the terminal identification information due to setting of an assignment range of terminal identification information for each network, and therefore, efficiency of use of resources such as a memory can be improved.

Therefore, in the wireless sensor system according to the embodiment of the present disclosure, an excellent system for transmitting the result of measurement by the sensor 21 from the wireless terminal device 101 to the lower-order management device 171, can be constructed.

In the wireless sensor system according to the embodiment of the present disclosure, the lower-order management device 171 transmits, to another device, measurement information obtained by changing the terminal identification information included in the measurement information transmitted from wireless terminal device 101, to the corresponding unique identification information.

With this configuration, the measurement information can be transmitted from the lower-order management device 171 to another device that cannot process the terminal identification information.

In the wireless sensor system according to the embodiment of the present disclosure, one or a plurality of wireless terminal devices 101 are driven by electric power stored in a power storage unit, and transmit measurement information indicating the results of measurements by sensors 21. A plurality of lower-order management devices 171 receive the measurement information transmitted from the wireless terminal devices 101. A higher-order management device 161 is in communication with each lower-order management device 171. The higher-order management device 161 assigns, to each wireless terminal device 101, identification information that allows identification of a format of the measurement information. The wireless terminal device 101 includes, in the measurement information, the identification information assigned by the higher-order management device 161, and transmits the measurement information.

With this configuration, since the higher-order management device 161 unitarily manages the identification information, overlapping of the identification information can be avoided in contrast to the case where, for example, identification information is determined and assigned to each of networks under control of the lower-order management device 171. Therefore, even when a wireless terminal device moves to a network under control of another lower-order management device 171 under control of the same higher-order management device 161, the wireless terminal device 101 can continue to use the same identification information. This prevents a dead number from occurring in the identification information due to setting of the assignment range of the identification information for each network, and therefore, efficiency of use of resources such as a memory can be improved. In addition, since the wireless terminal device 101 transmits the information indicating its own setting content, the higher-order management device 161 can easily determine whether or not the setting content of the wireless terminal device 101 is appropriate. In addition, since the identification information is included in the measurement information, the communication operation can be simplified.

Therefore, in the wireless sensor system according to the embodiment of the present disclosure, an excellent system for transmitting the result of measurement by the sensor 21 from the wireless terminal device 101 to the lower-order management device 171, can be constructed.

In the communication control method according to the embodiment of the present disclosure, firstly, the higher-order management device 161 assigns, to a wireless terminal device, terminal identification information having a shorter data length than unique identification information, of the wireless terminal device, registered therein. Next, the wireless terminal device 101 includes, in measurement information, the terminal identification information assigned by the higher-order management device 161, and transmits the measurement information.

With this configuration, the transmission amount of data can be reduced. In addition, since the higher-order management device 161 unitarily manages the terminal identification information, overlapping of the terminal identification information can be avoided in contrast to the case where, for example, terminal identification information is determined and assigned to each of networks under control of the lower-order management device 171. Therefore, even when a wireless terminal device moves to a network under control of another lower-order management device 171 under control of the same higher-order management device 161, the wireless terminal device 101 can continue to use the same terminal identification information. This prevents a dead number from occurring in the terminal identification information due to setting of the assignment range of the terminal identification information for each network, and therefore, efficiency of use of resources such as a memory can be improved.

Therefore, in the communication control method according to the embodiment of the present disclosure, an excellent system for transmitting the result of measurement by the sensor 21 from the wireless terminal device 101 to the lower-order management device 171, can be constructed.

In the communication control method according to the embodiment of the present disclosure, firstly, the higher-order management device 161 assigns, to the wireless terminal device 101, identification information that allows identification of a format of the measurement information. Next, the wireless terminal device 101 includes, in the measurement information, the identification information assigned by the higher-order management device 161, and transmits the measurement information.

With this configuration, since the higher-order management device 161 unitarily manages the identification information, overlapping of the identification information can be avoided in contrast to the case where, for example, identification information is determined and assigned to each of networks under control of the lower-order management device 171. Therefore, even when a wireless terminal device moves to a network under control of another lower-order management device 171 under control of the same higher-order management device 161, the wireless terminal device 101 can continue to use the same identification information. This prevents a dead number from occurring in the identification information due to setting of the assignment range of the identification information for each network, and therefore, efficiency of use of resources such as a memory can be improved. In addition, since the wireless terminal device 101 transmits the information indicating its own setting content, the higher-order management device 161 can easily determine whether or not the setting content of the wireless terminal device 101 is appropriate. In addition, since the identification information is included in the measurement information, the communication operation can be simplified.

Therefore, in the communication control method according to the embodiment of the present disclosure, an excellent system for transmitting the result of measurement by the sensor 21 from the wireless terminal device 101 to the lower-order management device 171, can be constructed.

The disclosed embodiments are merely illustrative in all aspects and should not be recognized as being restrictive. The scope of the present disclosure is defined by the scope of the claims rather than by the description above, and is intended to include meaning equivalent to the scope of the claims and all modifications within the scope.

The above description includes the features in the additional notes below.

[Additional Note 1]

A wireless sensor system comprising:
- a wireless terminal device which is driven by electric power stored in a power storage unit, and is configured to transmit measurement information indicating a result of measurement by a sensor; and
- a management device configured to receive the measurement information transmitted from the wireless terminal device, wherein
- the wireless terminal device performs one-way communication in a first period, transmits the measurement information in the first period, performs bidirectional communication in a second period different from the first period, and transmits other information in the second period, and
- the wireless terminal device performs at least one of transition to a first sleep state after the transmission of the measurement information, and transition to a second sleep state after the transmission of the other information.

[Additional Note 2]

A wireless terminal device driven by electric power stored in a power storage unit, comprising:
- a data creation unit configured to create measurement information indicating a result of measurement by a sensor: and
- a communication unit configured to transmit a radio signal including the measurement information created by the data creation unit or other information, wherein
- the communication unit performs one-way communication in a first period, transmits the measurement information in the first period, performs bidirectional communication in a second period different from the first period, and transmits other information in the second period, and
- the wireless terminal device performs at least one of transition to a first sleep state after the transmission of the measurement information, and transition to a second sleep state after the transmission of the other information.

[Additional Note 3]

A wireless sensor system comprising:
- a wireless terminal device which is driven by electric power stored in a power storage unit, and is configured to transmit measurement information indicating a result of measurement by a sensor;
- a relay device configured to relay information received from the wireless terminal device; and
- a management device configured to receive the measurement information relayed by the relay device, wherein
- the wireless terminal device transmits a preparation request,
- the relay device receives the preparation request transmitted from the wireless terminal device, and relays the preparation request to the management device,
- the management device receives the preparation request relayed by the relay device, and transmits, to the relay device, setting information related to the wireless terminal device,
- the relay device receives and holds the setting information transmitted from the management device.
- after the transmission of the preparation request, the wireless terminal device transitions to a first sleep state to stop a communication operation, and transmits a setting request after returning from the first sleep state, the relay device receives the setting request transmitted from the wireless terminal device, and transmits the setting information held therein to the wireless terminal device, and the wireless terminal device transitions to a second sleep state after the transmission of the measurement information.

[Additional Note 4]

A wireless sensor system comprising:

one or a plurality of wireless terminal devices each being driven by electric power stored in a power storage unit, and being configured to transmit measurement information indicating a result of measurement by a sensor;

a plurality of lower-order management devices configured to receive the measurement information transmitted from the wireless terminal devices; and a higher-order management device configured to be communicable with each lower-order management device, wherein the higher-order management device assigns, to each wireless terminal device, terminal identification information having a shorter data length than unique identification information, of the wireless terminal device, which is registered therein, the wireless terminal device includes, in the measurement information, the terminal identification information assigned by the higher-order management device, and transmits the measurement information, and the wireless terminal device performs at least one of transition to a first sleep state after the transmission of the measurement information, and transition to a second sleep state after the transmission of other information.

[Additional Note 5]

A wireless sensor system comprising:

one or a plurality of wireless terminal devices each being driven by electric power stored in a power storage unit, and being configured to transmit measurement information indicating a result of measurement by a sensor;

a plurality of lower-order management devices configured to receive the measurement information transmitted from the wireless terminal devices; and a higher-order management device configured to communicable with each lower-order management device, wherein the higher-order management device assigns, to each wireless terminal device, identification information that allows identification of a format of the measurement information, the wireless terminal device includes, in the measurement information, the identification information assigned by the higher-order management device, and transmits the measurement information, and the wireless terminal device performs at least one of transition to a first sleep state after the transmission of the measurement information, and transition to a second sleep state after the transmission of other information.

REFERENCE SIGNS LIST 1 sensor module
21 sensor
22 data creation unit
23 communication unit
24, 43, 53, 63 storage unit
41 sensor-side communication processing unit
42 higher-order-side communication processing unit
51, 61 reception processing unit
52, 62 transmission processing unit
101 wireless terminal device
151 relay device
161 higher-order management device
171 lower-order management device
181 cloud server
301 wireless sensor system

The invention claimed is:

1. A wireless sensor system comprising:
one or a plurality of wireless terminal devices each being driven by electric power stored in a power storage unit, and being configured to transmit measurement information indicating a result of measurement by a sensor;
a plurality of lower-order management devices configured to receive the measurement information transmitted from the wireless terminal devices; and
a higher-order management device configured to be communicable with each lower-order management device, wherein
the higher-order management device assigns, to each wireless terminal device, terminal identification information having a shorter data length than unique identification information, of the wireless terminal device, which is registered therein, and
the wireless terminal device includes, in the measurement information, the terminal identification information assigned by the higher-order management device, and transmits the measurement information.

2. The wireless sensor system according to claim 1, wherein each lower-order management device transmits, to another device, the measurement information obtained by changing the terminal identification information included in the measurement information transmitted from the wireless terminal device, to the corresponding unique identification information.

3. A wireless sensor system comprising:
one or a plurality of wireless terminal devices each being driven by electric power stored in a power storage unit, and being configured to transmit measurement information indicating a result of measurement by a sensor;
a plurality of lower-order management devices configured to receive the measurement information transmitted from the wireless terminal devices; and
a higher-order management device configured to be communicable with each lower-order management device, wherein
the higher-order management device assigns, to each wireless terminal device, identification information that allows identification of a format of the measurement information, and
the wireless terminal device includes, in the measurement information, the identification information assigned by the higher-order management device, and transmits the measurement information.

4. A communication control method performed in a wireless sensor system which includes one or a plurality of wireless terminal devices each being driven by electric power stored in a power storage unit and being configured to transmit measurement information indicating a result of measurement by a sensor, a plurality of lower-order management devices configured to receive the measurement information transmitted from the wireless terminal devices, and a higher-order management device configured to be communicable with each lower-order management device, the method comprising:
- by the higher-order management device, assigning, to each wireless terminal device, terminal identification information having a shorter data length than unique identification information, of the wireless terminal device, which is registered in the higher-order management device; and
- by each wireless terminal device, including the terminal identification information assigned by the higher-order management device in the measurement information, and transmitting the measurement information.

5. A communication control method performed in a wireless sensor system which includes one or a plurality of wireless terminal devices each being driven by electric power stored in a power storage unit and being configured to transmit measurement information indicating a result of measurement by a sensor, a plurality of lower-order management devices configured to receive the measurement information transmitted from the wireless terminal devices, and a higher-order management device configured to be communicable with each lower-order management device, the method comprising:
- by the higher-order management device, assigning, to each wireless terminal device, identification information that allows identification of a format of the measurement information; and
- by each wireless terminal device, including the identification information assigned by the higher-order management device in the measurement information, and transmitting the measurement information.

* * * * *